United States Patent
Nilsson

(10) Patent No.: US 7,406,070 B2
(45) Date of Patent: Jul. 29, 2008

(54) ADAPTIVE THRESHOLD FOR HS-SCCH PART 1 DECODING

(75) Inventor: Johan Nilsson, Hollviken (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 645 days.

(21) Appl. No.: 10/780,633

(22) Filed: Feb. 19, 2004

(65) Prior Publication Data

US 2005/0078648 A1   Apr. 14, 2005

Related U.S. Application Data

(60) Provisional application No. 60/509,530, filed on Oct. 9, 2003.

(51) Int. Cl.
*H04B 7/216* (2006.01)
*H04L 1/00* (2006.01)
*H04L 5/04* (2006.01)

(52) U.S. Cl. .............. 370/342; 370/335; 370/252; 370/204

(58) Field of Classification Search ............. 370/342, 370/335, 252, 204
See application file for complete search history.

(56) References Cited

U.S. PATENT DOCUMENTS

| | | | |
|---|---|---|---|
| 5,748,098 A | 5/1998 | Grace | |
| 5,815,507 A | 9/1998 | Vinggaard et al. | |
| 5,940,431 A | 8/1999 | Haartsen et al. | |
| 6,012,160 A | 1/2000 | Dent | |
| 6,108,366 A | 8/2000 | Haartsen | |
| 6,112,093 A | 8/2000 | Nordlund | |
| 6,345,066 B1 | 2/2002 | Haartsen | |
| 6,590,928 B1 | 7/2003 | Haartsen | |
| 7,020,183 B2 * | 3/2006 | Nakamura | 375/150 |
| 7,072,618 B1 * | 7/2006 | Strutt | 455/67.13 |
| 2002/0048330 A1 | 4/2002 | Schetelig et al. | |
| 2002/0141568 A1 | 10/2002 | Thomasson et al. | |
| 2003/0123470 A1 | 7/2003 | Kim et al. | |
| 2003/0192003 A1 | 10/2003 | Das et al. | |
| 2004/0022177 A1 * | 2/2004 | Awad et al. | 370/204 |
| 2006/0036434 A1 * | 2/2006 | May et al. | 704/229 |

FOREIGN PATENT DOCUMENTS

| | | |
|---|---|---|
| EP | 1335350 A2 | 8/2003 |
| WO | WO 01/26260 A1 | 4/2001 |
| WO | WO 03/077064 A2 | 9/2003 |

OTHER PUBLICATIONS

European Search Report dated Nov. 2, 2004 in connection with U.S. Appl. No. 10/780,620.

(Continued)

*Primary Examiner*—Barry W Taylor
(74) *Attorney, Agent, or Firm*—Potomac Patent Group PLLC

(57) ABSTRACT

Whether to abort reception of a multi-part message in a code division multiple access communication system is determined by receiving a part of the multi-part message. Correlating the received part of the multi-part message with a known sequence generates a correlation value. The correlation value is compared with a threshold level. Reception of the multi-part message is aborted if the correlation value is less than a threshold level. In another aspect, the threshold level is dynamically adjusted based on a communication traffic behavior. The communication traffic behavior may be, for example, whether traffic directed to a particular user equipment (UE) is part of a burst directed to that UE.

45 Claims, 13 Drawing Sheets

OTHER PUBLICATIONS

Haartsen, J.C., "The Bluetooth Radio System," IEEE Personal Communications, Feb. 2000.

PCT International Search Report, dated Feb. 18, 2005, in connection with International Application No. PCT/EP2004/011147.

PCT Written Opinion, dated Feb. 18, 2005, in connection with International Application No. PCT/EP2004/011147.

Texas Instruments: "HS-SCCH: Performance results and improved structure" 3GPP TSG RAN WG1 Meeting 25, 'Online! Apr. 9, 2002, XP002314992 Paris, France. Retrieved from the Internet: URL:http://www.3gpp.org/ftp/tsg_ran/WG1_RL1/TSGR1_25/Docs/Zips/R1-02-0535.zip> 'retrieved on Jan. 25, 2005!

Hedberg, T., et al., "Evolving WCDMA." Ericsson Review, 2001, No. 3, pp. 124-130, December.

Zhang, Z, et al., "Advanced baseband technology in third-generation radio base stations." Ericsson Review, 2003, No. 1, pp. 32-41, December.

Müller, F., et al., "Further evolution of the GSM/EDGE radio access network . . . " Ericsson Review, 2001, No. 3, pp. 116, December.

Ekudden, E., et al, "On demand mobile media—A rich service experience for mobile users." Ericsson Review, 2001, No. 4, pp. 168-177, December.

"3$^{rd}$ Generation Partnership Project; Technical Specification Radio Access Network; Physical channels and mapping of transport channels onto physical channels (FDD) (Release 5)." 3$^{rd}$ Generation Partnership Project, Technical Specification 25.211, V5.5.0, Sep. 2003, pp. 1-51.

3rdGeneration Partnership Project; Technical Specification Radio Access Network; User Equipment (UE) radio transmission and reception (FDD) (Release 6), 3$^{rd}$ Generation Partnership Project, Technical Specification 25.101, V6.2.0, Sep. 2003, pp. 1-100.

3rdGeneration Partnership Project; Technical Specification Radio Access Network; Multiplexing and channel coding (FDD) (Release 5), 3$^{rd}$ Generation Partnership Project, Technical Specification, Technical Specification 25.212, V5.6.0, Sep. 2003, pp. 1-75.

* cited by examiner

ADAPTIVE THRESHOLD FOR HS-SCCH PART 1 DECODING

CROSS REFERENCE TO RELATED APPLICATIONS

This application claims the benefit of U.S. Provisional Application No. 60/509,530, filed Oct. 9, 2003, which is hereby incorporated herein by reference in its entirety. This application is related to U.S. patent application Ser. No. 10/780,620 filed on even date herewith in the name of Jacobus C. Haartsen and entitled "Adaptive Correlation of Access Codes In A Packet-Based Communications System."

BACKGROUND

The present invention relates to communications systems, more particularly to Code Division Multiple Access (CDMA) communications systems, and even more particularly to efficiently and accurately determining whether particular information has been detected in a received signal in a CDMA communications system.

The cellular telephone industry has made phenomenal strides in commercial operations throughout the world. Growth in major metropolitan areas has far exceeded initial expectations and is rapidly outstripping system capacity. If this trend continues, the effects of this industry's growth will soon reach even the smallest markets. Innovative solutions are required to meet these increasing capacity needs as well as to maintain high quality service and avoid rising prices.

Throughout the world, one important step in the advancement of radio communication systems has been the change from analog to digital transmission. Equally significant is the choice of an effective digital transmission scheme for implementing next generation technology. Furthermore, Personal Communication Networks (PCNs), employing low cost, pocket-sized, cordless telephones that can be carried comfortably and used to make or receive calls in the home, office, street, car, and the like, are being provided by, for example, cellular carriers using the digital cellular system infrastructure. An important feature desired in these new systems is increased traffic capacity, and efficient use of this capacity. It is also important for the portable devices in such systems to provide high quality service while conserving energy to whatever extent possible, since they are very often powered by batteries.

Recent efforts at providing such systems have focused on the use of Wideband CDMA (WCDMA) techniques. In a WCDMA system, multiple users utilize the same radio spectrum simultaneously. From the point of view of a receiver in a WCDMA system, a received signal comprises a desired signal (i.e., a signal intended to be received by that particular receiver) and a high level of noise. To enable the receiver to extract the desired signal from the received signal, information intended for that receiver is "spread" by combining (e.g., by multiplying) the information with a much higher bit rate known signature sequence. The signature sequence is unique to this particular receiver. One way to generate the signature sequence is with a pseudo-noise (PN) process that appears random, but can be replicated by an authorized user.

Because each active transmitter is utilizing the same process, a plurality of spread information signals modulate a radio frequency carrier, for example by binary phase shift keying (BPSK), and as said before, are jointly received as a composite signal at the receiver. Each of the spread signals overlaps all of the other spread signals, as well as noise-related signals, in both frequency and time. If the receiver is authorized, then the composite signal is correlated with one of the unique signature sequences, and the corresponding information signal can be isolated and despread. If quadrature phase shift keying (QPSK) modulation or quadrature amplitude modulation (QAM) is used, then the signature sequence may consist of complex numbers (having real and imaginary parts), where the real and imaginary parts are used to modulate respective ones of two carriers at the same frequency, but ninety degrees out of phase with respect to one another.

Traditionally, a signature sequence is used to represent one bit of information. However, other types of signature sequences can be employed. Receiving the transmitted signature sequence or its complement indicates whether the information bit is a +1 or −1, sometimes denoted "0" or "1". The signature sequence usually comprises some number, N, bits, and each bit of the signature sequence is called a "chip". The entire N-chip sequence, or its complement, is referred to as a transmitted symbol. The conventional receiver, such as a RAKE receiver, correlates the received signal with the complex conjugate of the known signature sequence to produce a correlation value. Only the real part of the correlation value is computed. When a large positive correlation results, a "0" is detected; when a large negative correlation results, a "1" is detected. It should be recognized that other types of receivers and other correlation techniques can be employed.

A number of efforts to standardize the use of WCDMA techniques in mobile communication systems exist. One such effort is being accomplished by the Third Generation Partnership Project ("3GPP"). The term "third generation" refers to the fact that so-called second-generation radio access technology brought mobile telephony to a broad market. By contrast, third-generation radio access technology extends beyond basic telephony: a common, Internet Protocol (IP)-based service platform will offer mobile users an abundance of real-time and non-real time (traditional data) services.

Typical services with real-time requirements are voice and video, as well as delay-sensitive applications, such as traffic-signaling systems, remote sensing, and systems that provide interactive access to World Wide Web (WWW) servers. As explained in, for example, F. Müller et al., "Further evolution of the GSM/EDGE radio access network", Ericsson Review vol. 78, no. 3, pp. 116-123 (2001), the challenge is to implement end-to-end services based on the Internet Protocol (IP). The main benefit of running IP end-to-end—including over the air interface—is service flexibility. Indeed, flexibility more or less eliminates dependencies between applications and underlying networks, for example, access networks. To date, cellular access networks have been optimized in terms of voice quality and spectrum efficiency for circuit-switched voice applications. However, for services such as IP multimedia, which includes voice, the main challenge is to retain comparable quality and spectrum efficiency without decreasing service flexibility. Today, for example, we can suffer considerable protocol overhead when we bridge the air interface with real-time protocol (RTP), user datagram protocol (UDP) or IP packets (which carry media frames). Needless to say, this runs counter to the goal of spectrum efficiency. To achieve spectrum efficiency, we can instead characterize different packet data streams in terms of bandwidth and delay requirements. Characterization of this kind is useful when implementing admission access algorithms that accommodate multiple user data streams in available spectrum. Different methods of limiting data (such as header compression and session signaling compression) must also be applied to obtain adequate spectrum efficiency.

T. Hedberg and S. Parkvall, "Evolving WCDMA", *Ericsson Review* vol. 77, no. 2 pp. 124-131 (2001) describes how, for the purpose of improving support for best-effort packet data, the 3GPP is working on an evolution of WCDMA known as high speed downlink packet data access (HSDPA). This enhancement to prior systems increases capacity, reduces round-trip delay, and increases peak data rates up to 8-10 Mbit/s. To achieve these goals, a new downlink shared channel (HS-DSCH) has been introduced. In addition, three fundamental technologies, which are tightly coupled and rely on the rapid adaptation of the transmission parameters to the instantaneous radio conditions, have been introduced with this channel:

fast-link adaptation technology allows adaptation of the channel coding rate, and enables the use of spectral-efficient higher-order modulation (e.g., 16 QAM) when channel conditions permit (for example, during a fading peak), and reverts to robust QPSK modulation during less favorable channel conditions (for example, when experiencing a fading dip);

fast hybrid automatic-repeat-request (H-ARQ) technology rapidly requests the retransmission of missing data entities and combines the soft information from the original transmission and any subsequent retransmissions before any attempts are made to decode a message; and fast scheduling of users sharing the HS-DSCH—this technique, which exploits multi-user diversity, strives to transmit to users with favorable radio conditions.

With the basic principles above, there is a possibility of unequal service provision, offering higher data rates to users in favorable conditions.

One aspect of HSDPA is its channel structure. The transport channel for carrying user data is a high-speed downlink shared channel (HS-DSCH). A corresponding physical channel is denoted by HS-PDSCH. The HS-DSCH code resources include one or more channelization codes with a fixed spreading factor of 16. In order to leave sufficient room for other required control and data bearers, up to 15 such codes can be allocated. The available code resources are primarily shared in the time domain. For example, they may be allocated to one user at a time. Alternatively, the code resources may be shared using code multiplexing. In this case, two to four users share the code resources within a same transmission time interval (TTI).

The HS-DSCH employs a short (2 ms) TTI in order to reduce link adaptation delays, increase the granularity in the scheduling process, facilitate better tracking of the time varying radio conditions, and decrease the round trip time (RTT).

In addition to user data, it is also necessary to transmit control signaling to notify the next user equipment (UE) to be scheduled. This signaling is conducted on a high-speed shared control channel (HS-SCCH), which is common to all users. The HS-SCCH is transmitted two slots in advance of the corresponding HS-DSCH TTI. The HS-SCCH is encoded by a user equipment-specific mask and also contains lower layer control information, including the employed settings for modulation, coding scheme, channelization code, and H-ARQ.

In addition to the above-described channels, every user equipment has an associated dedicated physical channel (DPCH) in both the uplink and downlink directions. The downlink associated channel carries the signal radio bearer for Layer 3 signaling as well as power control commands for the uplink channel. By contrast, the uplink channel is used as a feedback channel, which for example might carry the TPC commands for downlink power control. If needed, other services (e.g., circuit-switched voice or video) can also be carried on the DPCH.

The HSDPA concept also calls for an additional high-speed dedicated physical control channel (HS-DPCCH) in the uplink for carrying the Channel Quality Indicator (CQI) information in addition to the H-ARQ acknowledgements.

Focusing now on the HS-SCCH, it is used to address the UE by the network. The HS-SCCH carries the following information:

1. UE identity (16 bits): $X_{ue}$
2. Channelization-code-set (7 bits): $X_{ccs}$
3. Modulation scheme information (1 bit): $X_{ms}$
4. Transport-block size information (6 bits): $X_{tbs}$
5. Hybrid-ARQ process information (3 bits): $X_{hap}$
6. Redundancy and constellation version (3 bits): $X_{rv}$
7. New data indicator (1 bit): $X_{nd}$ The first three of the above are needed to be able to set up the RAKE receiver for reception of the HS-PDSCH—indeed the UE identity information is used by the UE to determine whether it is the intended recipient of the data that is about to be transmitted. Thus, the HS-SCCH is transmitted in two successive parts, with the first three of the above being transmitted in Part 1 of the HS-SCCH. The remaining information is carried in Part 2 of the HS-SCCH. All Layer 1 (L1) information is transmitted on the HS-SCCH; that is, no L1 information is transmitted on the HS-PDSCH or DPCH.

There can be up to a maximum of four HS-SCCH codes to monitor in a cell, all transmitted with a spreading factor of 128 and QPSK modulation. In order to allow time for decoding and setting up the receiver for reception in the UE, the HS-PDSCH sub-frame (which carries the user data) doesn't begin until two slots after the start of the HS-SCCH sub-frame. This is illustrated in FIG. 1, and described in greater detail in 3GPP TS 25.101 V5.5.0 (2003-09). This arrangement allows the entire HS-SCCH Part 1 to be received and then decoded simultaneously with reception of the first slot of HS-SCCH Part 2.

FIG. 2 is a flowchart depicting conventional actions performed within a UE in connection with the HS-SCCH. It should be understood that if the UE, due to its UE Category, has limits on inter-TTI, then there has to be a certain distance between TTIs with HS-PDSCH. This will make HS-SCCH reception unnecessary for some TTIs. Thus, an initial action taken by the UE is to wait until a next possible subframe (step 201). Then, HS-SCCH Part 1 is received for up to four spreading codes (step 203).

Next, two operations are performed in parallel: HS-SCCH Part 1 is decoded (step 205) and slot 1 of HS-SCCH Part 2 is received for all possible codes (step 207). Which, if any, of these received HS-SCCH Part 2s to use will be decided by the Part 1 information.

It needs to be determined whether the UE detected that the received HS-SCCH Part 1 is intended for this particular UE (decision block 209). If the answer is "no" ("NO" path out of decision block 209), then there is no point in taking further steps to receive this HS-SCCH, and the process is aborted (step 211). In this case, processing will continue back at step 201.

If it has been determined that the decoded HS-SCCH Part 1 is intended for this UE ("YES" path out of decision block 209), then it is known which code, c, applies to this HS-SCCH. Processing then continues by using the spreading codes from the Part 1 decoding to set up the UE to receive the HS-PDSCH (step 213) and, in parallel with this action, receiving the second slot of Part 2 for HS-SCCH associated with code c (step 215) and then decoding Part 2 of the HS-SCCH associated with code c (step 217).

After the HS-SCCH Part 2 has been received and decoded, its CRC code can be checked to determine whether decoding has been successful (decision block 219). If not ("NO" path out of decision block 219), then HS-PDSCH reception is aborted (step 221) and processing reverts back to step 201.

If the HS-SCCH Part 2 decoding was successful ("YES" path out of decision block 219), then the UE is set up for reception of HS-PDSCH slot 3 according to code c (step 223). The UE is then set up to decode the HS-PDSCH using parameters derived from HS-SCCH Part 2 decoding (step 225).

Referring back to decision block 219, it should be understood that an unsuccessful decoding of HS-SCCH Part 2 can be the result of errors introduced in the HS-SCCH Part 2 itself, but it can also be the result of erroneously determining that HS-SCCH Part 1 had been successfully detected. To show why this is so, the following discussion will take a closer look at HS-SCCH Part 1.

FIG. 3 illustrates the conventional process that is undertaken to construct the HS-SCCH information (both Parts 1 and 2). The $X_{ccs}$ and $X_{ms}$ parameters are combined by a multiplexer 301 to generate data denoted $X_1$. As is conventional in the art, multiplexers 301 and 311 which concatenate inputs into an output are illustrated without a selection control input. In order to generate the Part 1 portion of HS-SCCH, the data $X_1$ is then convolutionally encoded by channel coding logic 303 that performs channel coding 1 to generate data denoted $Z_1$. Rate matching logic 305 then performs Part 1 rate matching that transforms the data $Z_1$ into data denoted $R_1$.

In order to enable the UE to detect that it is the intended recipient of the HS-SCCH Part 1 message, UE masking logic 307 that performs UE specific masking on $R_1$ is then applied. The details of this masking will now be described in connection with the logic diagram illustrated in FIG. 4. In one aspect of this logic, a unique code representing the UE that is the intended recipient is generated by applying convolutional coding logic 401 to the 16-bit $X_{ue}$ data to generate a 48-bit number denoted bi. Puncturing logic 403 is then applied to bi to generate a 40-bit number denoted ci. The number ci is then applied as a mask to the data R1 by performing a logical exclusive-OR (XOR) operation 405 between the two values. The resulting value is denoted $S_1$.

The idea behind this masking is that each UE receiving the HS-SCCH Part 1 message can apply its own known value of ci in a de-masking operation. For example, where XOR is used as a masking function, then again applying the same ci value will un-do the original masking operation. If the resulting value is a useable $R_1$ value (i.e., if $R_1$ is a valid codeword), this means that the UE's value of ci was the right one, and that UE is the intended recipient of the HS-SCCH. All other UE's will apply the wrong-valued ci, which will result in a non-decodable value, thus informing each of those UE's that it was not the intended recipient of the HS-SCCH Part 1 message. It has been determined that the minimum Hamming distance between two masks (ci in FIG. 4) is 8.

It is worth noting that, while in principle, each UE applies masking to the received HS-SCCH Part 1 and then determines whether the resultant $R_1$ is a valid codeword, this is not necessary in practical embodiments. The reason for this is because each UE is capable of knowing what its own HS-SCCH Part 1 ought to look like just prior to de-masking. Thus, more efficient embodiments can be implemented that skip the UE's own masking step.

Referring back now to FIG. 3, the generation of HS-SCCH Part 2 information will now be described. In one aspect, r, s, and b parameters are provided to RV coding logic 309 to generate redundancy and constellation version information, $X_{rv}$. The $X_{rv}$ information as well as $X_{tbs}$, $X_{hap}$, and $X_{nd}$ are combined in multiplexing logic 311 to generate $X_2$ information. The $X_2$ information along with $X_{ue}$ and $X_1$ are then supplied to UE specific CRC attachment logic 313 to generate Y information. Specifically, the UE specific attachment logic 313 combines the Part 1 information ($X_1$) and Part 2 information ($X_2$) and generates a CRC. The CRC is masked with the UE identity ($X_{ue}$), and the result is appended to the Part 2 information to generate the Y information. For more information regarding the operation of the UE specific CRC attachment logic, the interested reader should refer to the document 3GPP TS 25.212 V5.6.0 (2003-09), the entire contents of which are herein expressly incorporated by reference. This is then processed by channel coding 2 logic 315 to generate $Z_2$ information. The $Z_2$ information is processed by rate matching 2 logic 317 to generate $R_2$ information.

Finally, the $S_1$ information (from HS-SCCH Part 1 generation) and the $R_2$ information are subjected to physical channel mapping logic 319 to yield the HS-SCCH.

Referring back to Part 1 detection (e.g., decision block 209 in FIG. 2), it is known to utilize a maximum likelihood (ML) algorithm to correlate the received HS-SCCH Part 1 information with all 256 possible hypothesized codewords $R_1$ (or $S_1$ if masking is included). The ML method will now be explained in greater detail.

Introduce $\hat{S}_1^c$ as the received codeword on code $c \in [1, \ldots, n_c]$. In the described approach de-masking is not done on the received codeword. Masking is instead included in the hypothesized codewords. An equivalent method is to work on de-masked received codewords $\hat{R}_1^c$. We model $\hat{S}_1^c$ as:

$$\hat{S}_1^c = \begin{cases} S_1 + e_c & \text{if } UE \text{ addressed on code } c \\ v_c + e_c & \text{if } UE \text{ not addressed on code } c \end{cases}$$

where $e_c$ is a noise vector containing impairments from imperfect transmission/reception, and $v_c$ is a random vector due to the masking/de-masking arrangement.

In the example of HSDPA, $X_1$ is an 8-bit vector. Therefore, there are 256 corresponding codewords $S_1$ for any given UE. The codewords are enumerated $S_1^i$, $i \in [0, \ldots, 255]$. If we introduce $$S_1^{mat} = \begin{bmatrix} S_1^0 \\ S_1^2 \\ \vdots \\ S_1^{255} \end{bmatrix},$$

then the decision matrix D is constructed as $$D = S_1^{mat} [\hat{S}_1^{1T} \ldots \hat{S}_1^{n_cT}].$$

The maximum likelihood detection for each code c is then found as the row number associated with the largest value in the corresponding column of D:

$$ML_c = \text{maxind}(D(:,c)), c = [1, \ldots, n_c]$$

To allow for comparison of ML estimates from different codes, estimates of the variance of $v_c + e_c$ are formulated as $$V_c = 1/254 [D(\text{excl}.ML_c, c)]^T [D(\text{excl}.ML_c, c)]$$

where "excl." means exclude element with index x, and in this case results in a new vector with one less element, i.e., without the peak. The detection can then be defined as $$c_{detection} = \underset{c\in[1,\ldots,n_c]}{maxind}\,(D(ML_c, c)/sqrt(V_c))$$

$$X_{1\_detection} = ML_{c\_detection}.$$

The UE identity masking is the only measure taken to provide enough reliable transmission of HS-SCCH Part 1 information. Unlike the Part 2 information, the Part 1 information is not protected by CRC coding. This is not absolutely critical, since a UE mistakenly believing that it has detected HS-SCCH Part 1 information for itself will discover the mistake when the HS-SCCH Part 2 information doesn't check out (due to the use of an erroneous code c in the decoding process). Similarly, if a UE mistakenly fails to detect HS-SCCH Part 1 information, this too will be discovered when the transmitter notices that no ACK has ever been received for the subsequently transmitted data.

Still, these errors are costly in terms of wasted power (e.g., a UE expending energy receiving and decoding HS-SCCH Part 2 and HS-PDSCH information that is not really intended for that UE) and lost time and bandwidth (e.g., to detect that a transmission was never received by an intended recipient, and to retransmit that information).

While this background section has focused on a specific example in connection with reception of HS-SCCH information in a 3GPP system, similar problems can arise in any communication system that relies on correlation techniques to determine whether information has been accurately detected, and whether a decision should be made to abort further efforts to receive a multi-part message.

Accordingly, it is desirable to provide methods and apparatuses that can employ correlation techniques to accurately receive and decode information in an efficient manner in HSDPA as well as other systems.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods, apparatuses and machine-readable storage media that determine whether to abort reception of a multi-part message in a code division multiple access communication system.

In one aspect, this is determined by receiving a part of the multi-part message. Correlating the received part of the multi-part message with a known sequence generates a correlation value. The correlation value is compared with a threshold level. Reception of the multi-part message is aborted if the correlation value is less than a threshold level.

In another aspect, the threshold level is dynamically adjusted based on a communication traffic behavior. The communication traffic behavior may be, for example, whether traffic directed to a particular user equipment (UE) is part of a burst directed to that UE.

In yet another aspect, detecting whether traffic directed to the particular UE is part of a burst directed to that UE comprises detecting whether the UE has been addressed at any time during a number, n, of the most recent transmission time intervals. The number, n, may, for example, be equal to 10.

In still another aspect, the threshold level may be permitted to assume any one of a plurality of possible threshold levels. In such embodiments, determining whether to abort reception of the multi-part message comprises ensuring that the threshold level takes on a lower one of the plurality of possible threshold levels if it is detected that traffic directed to the particular UE is part of a burst directed to that UE; and ensuring that the threshold level takes on a higher one of the plurality of possible threshold levels if it is not detected that traffic directed to the particular UE is part of a burst directed to that UE. In some embodiments, the plurality of possible threshold levels may comprise only a low threshold level and a high threshold level.

In some embodiments, the code division multiple access communication system is a High Speed Downlink Packet Access (HSDPA) system. In such embodiments, the part of the multi-part message might be a High Speed Shared Control Channel Part 1 (HS-SCCH Part 1) message.

In still another aspect of the invention, the HSDPA system includes a full set of possible known sequences. However, the correlation value is one of a set of correlation values that are generated by correlating each of a reduced set of possible known sequences against the HS-SCCH Part 1 message, wherein the reduced set of possible known sequences is generated from the full set of possible known sequences.

The reduced set of possible known sequences may include, for example, only those known sequences that signify something meaningful.

In another aspect, the reduced set of possible known sequences may include, for example, only those known sequences that are associated with one or more capabilities of a first User Equipment (UE), wherein the full set of possible known sequences includes at least one known sequence that is not associated with one or more capabilities of the first UE, and the at least one known sequence is associated with one or more capabilities of a second UE.

BRIEF DESCRIPTION OF THE DRAWINGS

The objects and advantages of the invention will be understood by reading the following detailed description in conjunction with the drawings in which.

DETAILED DESCRIPTION

Figure 1:
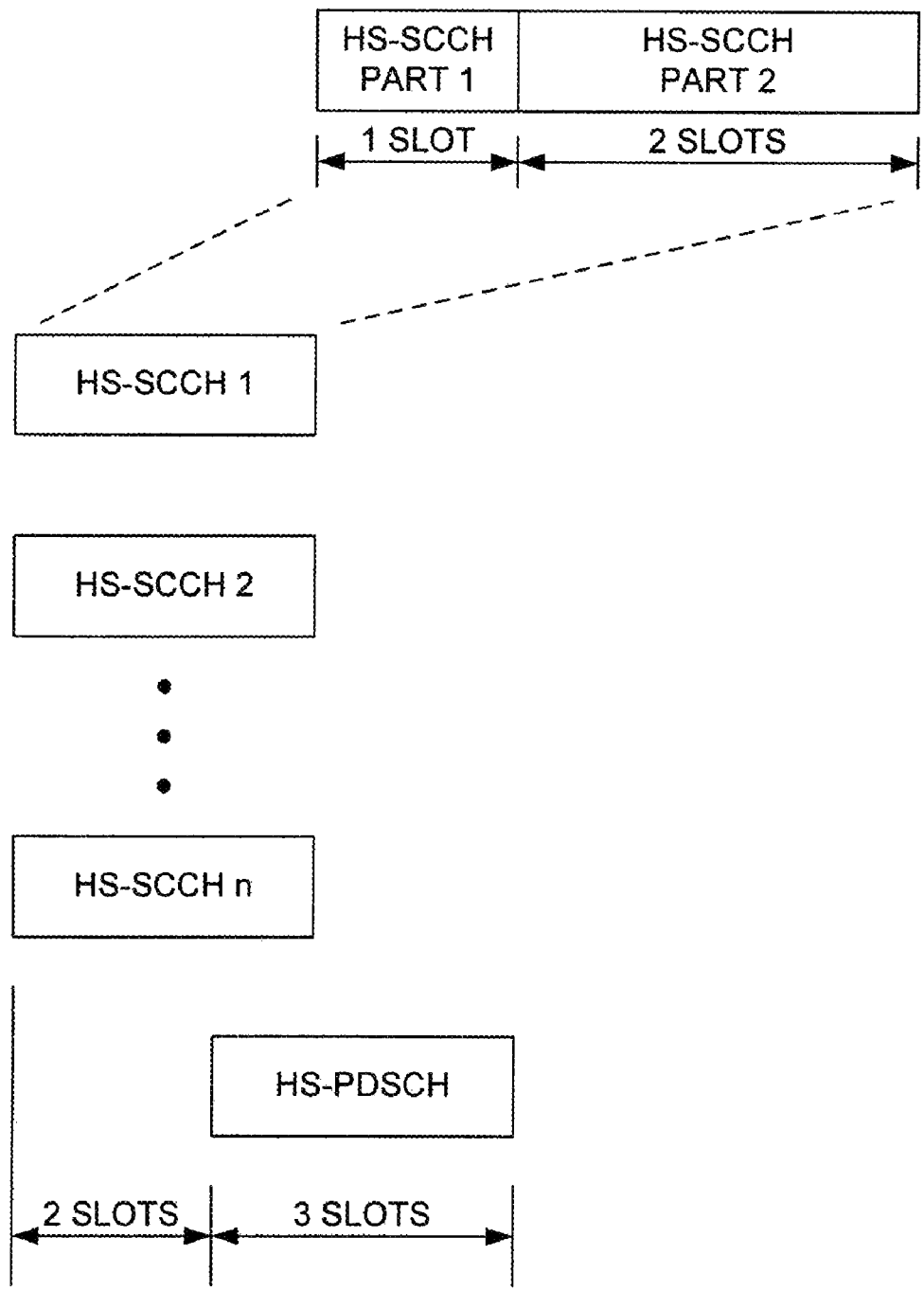
FIG. 1 is a timing diagram that illustrates the relationship between the start of a HS-PDSCH sub-frame and the start of a HS-SCCH sub-frame.
Figure 2:
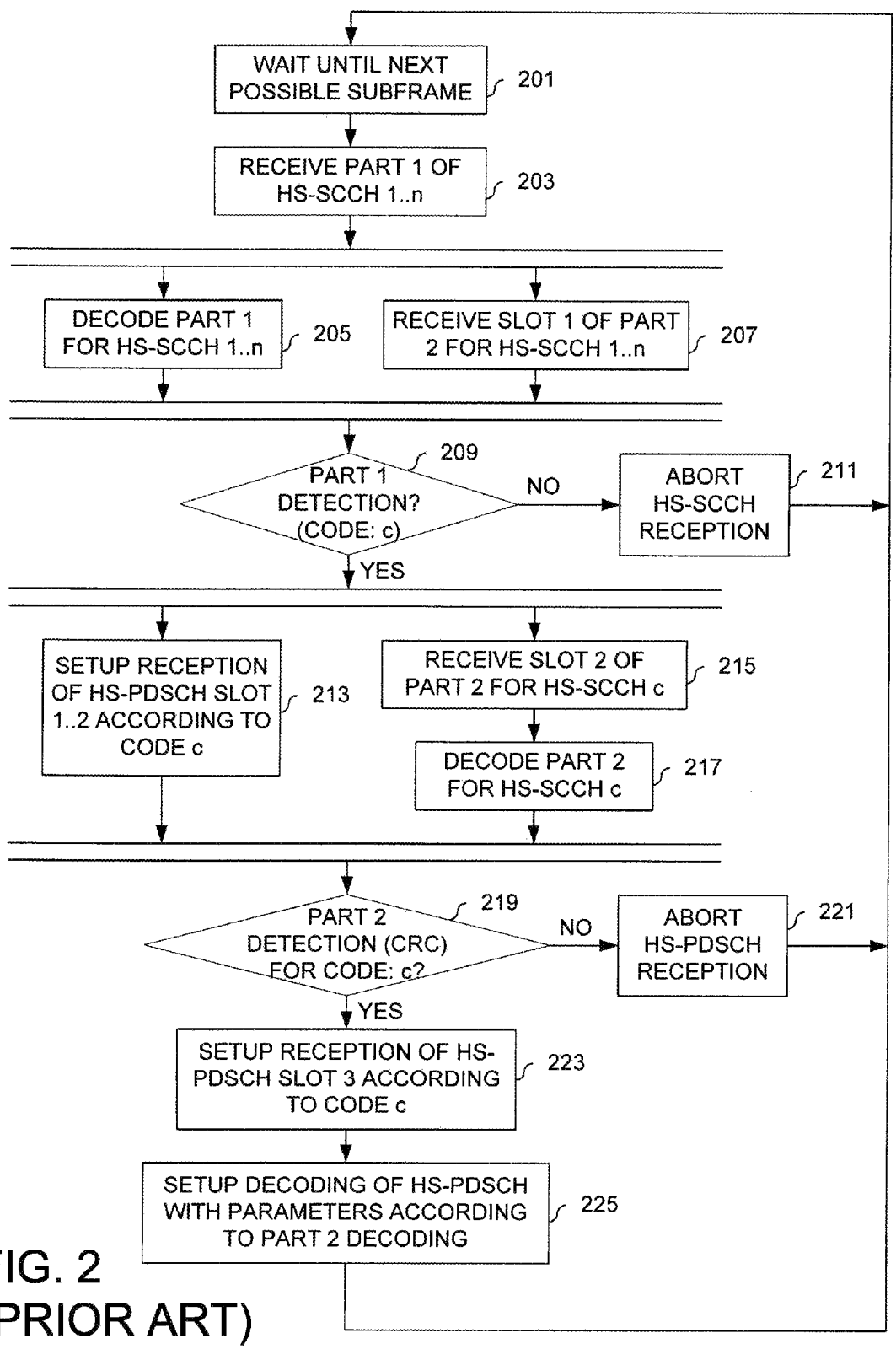
FIG. 2 is a flowchart depicting conventional actions performed within a UE in connection with the HS-SCCH.
Figure 3:
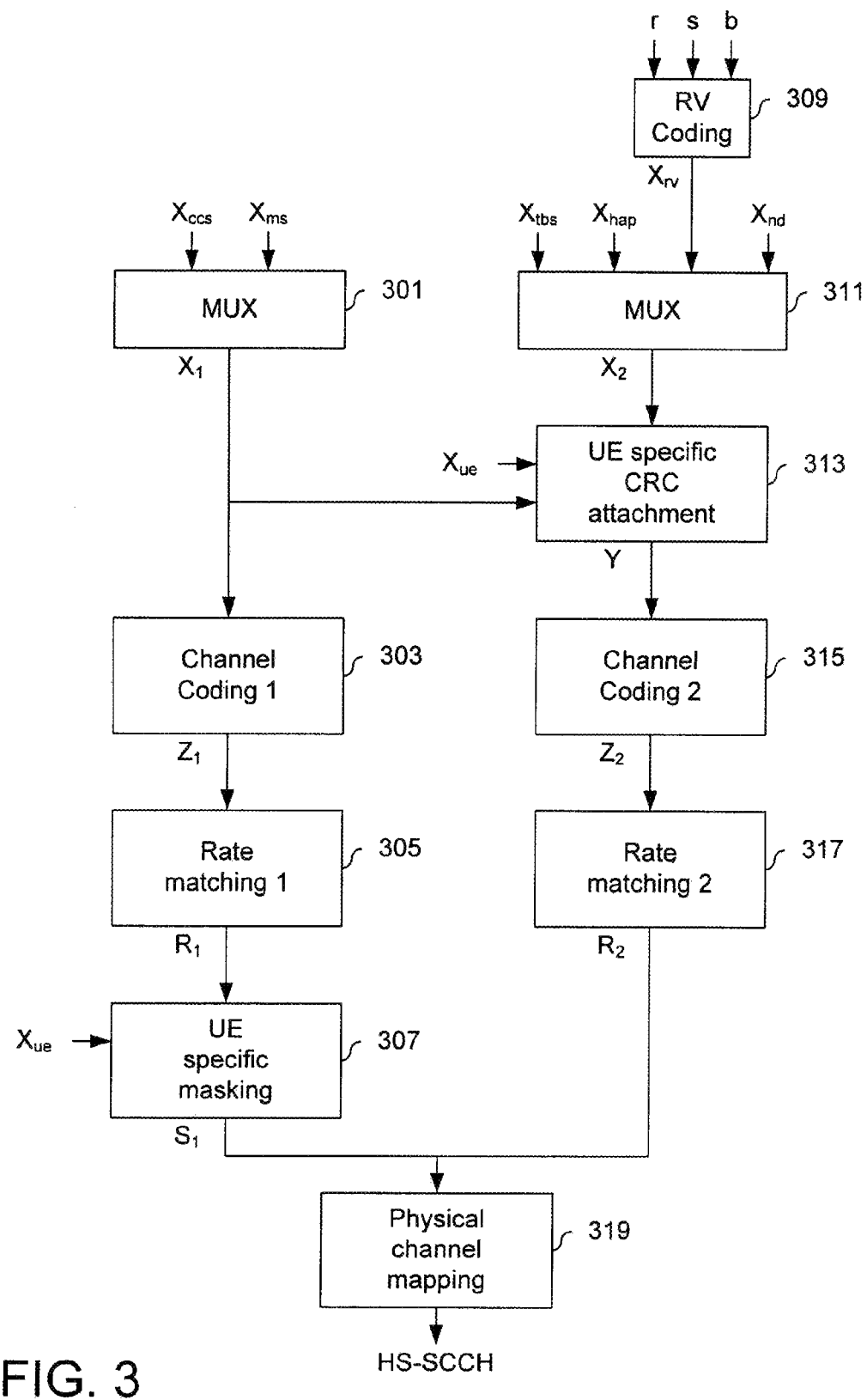
FIG. 3 illustrates a conventional process that is undertaken to construct HS-SCCH information (both Parts 1 and 2).
Figure 4:
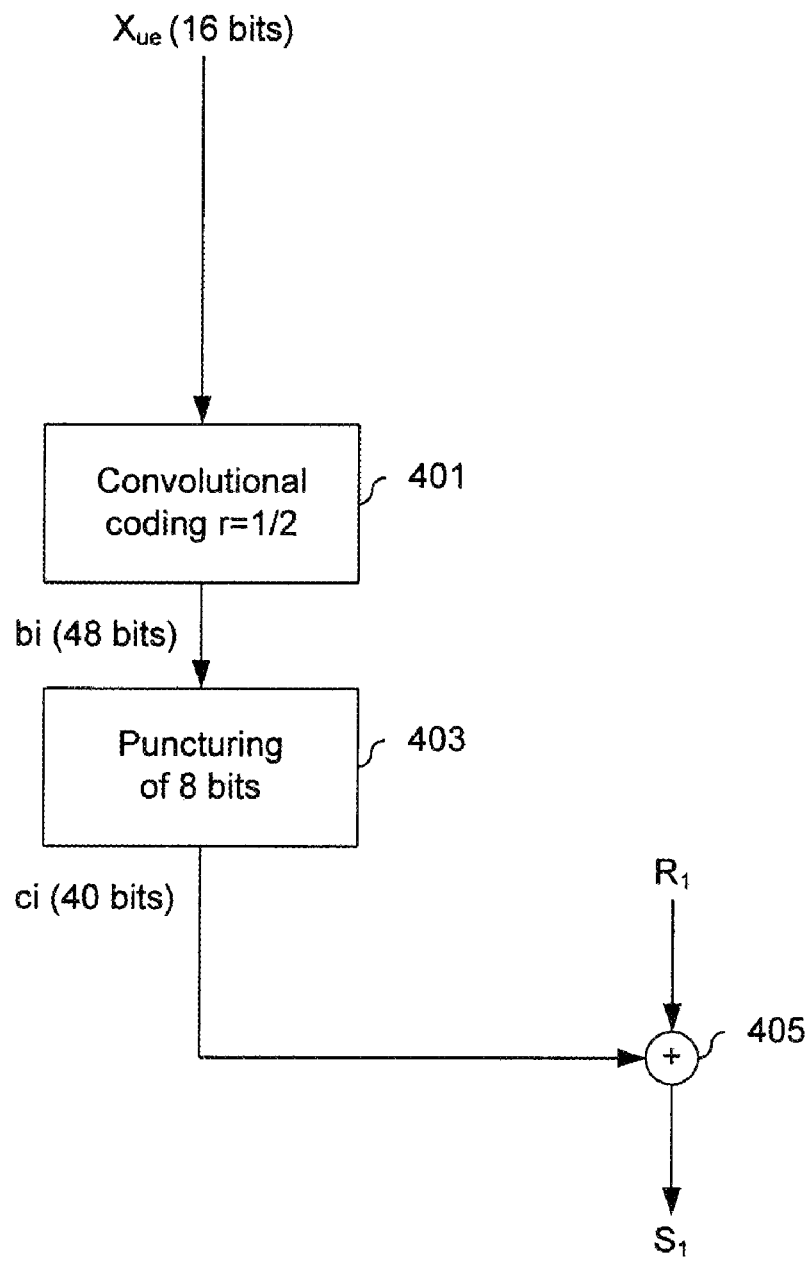
FIG. 4 is a logic diagram that illustrates details of UE masking logic that enables a UE to detect that it is the intended recipient of an HS-SCCH Part 1 message.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

As mentioned in the Background section, it is possible to detect that an HS-SCCH Part 1 message was erroneously detected (referred to herein as "false detection" or "false alarm") by relying on the failure of HS-SCCH Part 2 decoding. However, it is desirable to reduce current consumption by aborting HS-SCCH decoding as soon as possible if a false detection is likely. Thus, in accordance with one aspect of the invention, false detection is recognized by testing the quality of the HS-SCCH Part 1 detection. More specifically, a threshold value, $\tau$, is introduced that needs to be reached for a detection to be considered valid. This may be expressed as:

$$c_{detection} = \begin{cases} \text{if } \max_{c \in [1,\ldots,n_c]} \frac{D(ML_c, c)}{\sqrt{V_c}} > \tau \text{ then } \max_{c \in [1,\ldots,n_c]} \left( \frac{D(ML_c, c)}{sqrt(V_c)} \right) \\ \text{else no detection} \end{cases}$$

$$X_{1\_detection} = ML_{c\_detection}.$$

The discussion will now turn to techniques for assigning values to the threshold $\tau$. Tuning the decision threshold $\tau$ calls for a tradeoff to be made between the probability of false alarm ($P(E_{fa})$) and the probability of missed detection ($P(E_m)$) (i.e., the failure on the part of a UE to detect that an HS-SCCH Part 1 message really was intended for reception by that UE). Missed detection leads to decreased throughput, and false alarm leads to increased power consumption due to starting HS-SCCH Part 2 decoding and HS-PDSCH decoding without being addressed by Node B, i.e., the base station.

The best technique for tuning the value of $\tau$ will depend upon what method is used to determine whether an HS-SCCH code correlation is likely to be a correct detection. In the Background section, one detection technique was described in which a variance estimate is used to make this determination. However, a variance estimate could be quite complex to implement. An alternative is to use a "standard deviation estimate", as follows:

$$S_c = 1/\text{length}(D(:,c)) \sum_{i=\text{all elemnts excl. } ML_c} |D(i,c)|$$

With this modification, the detection algorithm is:

$$c_{detection} = \begin{cases} \text{if } \max_{c \in [1,\ldots,n_c]} \frac{D(ML_c, c)}{S_c} > \tau \text{ then } \max_{c \in [1,\ldots,n_c]} \left( \frac{D(ML_c, c)}{S_c} \right) \\ \text{else no detection} \end{cases}$$

$$X_{1\_detection} = ML_{c\_detection}.$$

Yet another (third) alternative implementation of a detection algorithm compares the ratio between largest correlation with the second largest correlation for each HS-SCCH code to a threshold $\tau$.

Regardless of which of the above or other detection algorithms are used, the influence of the threshold is such that a larger threshold will reduce the false alarm rate, but will also increase the probability of missed detection. Conversely, a decreased threshold yields the opposite relation.

In accordance with another aspect of the invention, the harsh tradeoff results that come from using a static threshold are relaxed by instead using an adaptation technique to dynamically adjust the threshold value, $\tau$, based on communication traffic behavior. One such behavior is whether or not traffic directed to a UE is part of a burst directed to that UE. Burst behavior typically occurs for file downloads, web surfing, and the like. In accordance with an embodiment of the invention,

- If the UE is in a burst, then a relatively low threshold value, $\tau$, should be used. This will yield some false alarms, but it will not jeopardize throughput.
- However, if the UE is not in a burst, then a relatively higher threshold value, $\tau$, is used. This will reduce the number of false alarms, and thereby reduce power consumption. However, the ability to detect a message will decrease slightly.

Any technique for detecting the existence of a burst may be used as part of the invention. One such technique is to declare that a burst exists if the UE has been addressed at any time during some number, n, of the most recent TTI's. Conversely, if the UE has not been addressed during any of the n most recent TTI's, then it is considered that no burst exists. As an example, n can be set to 10. Of course, this number can be adjusted to best suit the particular application. Another technique would be to declare that a burst exists if the UE has been addressed at least a number of times during the n most recent TTI's, wherein the number is larger than one.

An implementation of the adaptive threshold, then, can be:

$$\tau = \begin{cases} \tau_{low} & \text{if the } UE \text{ has been addressed in any of the most recent } n \text{ } TTI's \\ \tau_{high} & \text{otherwise} \end{cases}$$

where $\tau_{low}$ and $\tau_{high}$ represent the respective relatively low and high values of the threshold, $\tau$. The threshold values $\tau_{low}$ and $\tau_{high}$ should be tuned to yield desired performance. A potential danger with this approach is that the probability of missed detection will become so large with $\tau = \tau_{high}$ that the UE would not be able to detect that it is addressed after a transmission gap. However, it has been found (as will be discussed in greater detail below) that the probability of missed detection can be made to increase only slightly by adjusting the threshold from $\tau_{low}$ to $\tau_{high}$; that is, it can be made to change from 4% to 6%, or similar. At the same time, the probability of false alarm can be made to go from 50% (when $\tau_{low}$ is active) down to 1% (when $\tau_{high}$ is active).

A modification of the adaptive threshold technique can employ a filtered threshold. Specifically, an intermediate threshold $\tau'_t$ is set to either $\tau_{low}$ or $\tau_{high}$, $\tau_{low}$ and $\tau_{high}$ being calculated as discussed above. The selection of $\tau_{low}$ versus $\tau_{high}$ as the intermediate threshold $\tau'_t$ is based upon whether it is believed that a burst exists or a burst does not exist. $\tau'_t$ is filtered by a known filtering technique, for example $\tau'_{(t,filt)} = (1-\lambda_\tau)*\tau'_t + (\lambda_\tau*\tau'_{(t-1,filt)})$. $\tau'_{(t,filt)}$ is used as the threshold $\tau$.

Another modification of the adaptive threshold technique can employ filtered values for the addressing of the UE. Specifically, a parameter $x_t$ is set to 1 if the UE was addressed in $TTI_t$, and $x_t$ is set to 0 if the UE was not addressed. $x_t$ is then filtered using a known filtering method, for example $x_{(t,filt)} = (1-\lambda_x)*x_t + (\lambda_x*x_{(t-1,filt)})$. The filtered value $x_{(t,filt)}$ accounts for the recentness of the addressing of the UE. To determine whether the UE is in a burst $x_{(t,filt)}$ is compared to a threshold. The threshold which $x_{(t,filt)}$ is compared to is not the same threshold $\tau$. This threshold is selected to balance false detections and missed detections.

As an alternative to the use of two threshold value ($\tau_{high}$ and $\tau_{low}$), a plurality of thresholds can be employed to form a continuous spectrum of threshold values. Which of the plurality of threshold values to employ is determined based upon the recentness of addressing of the UE.

Figure 5:
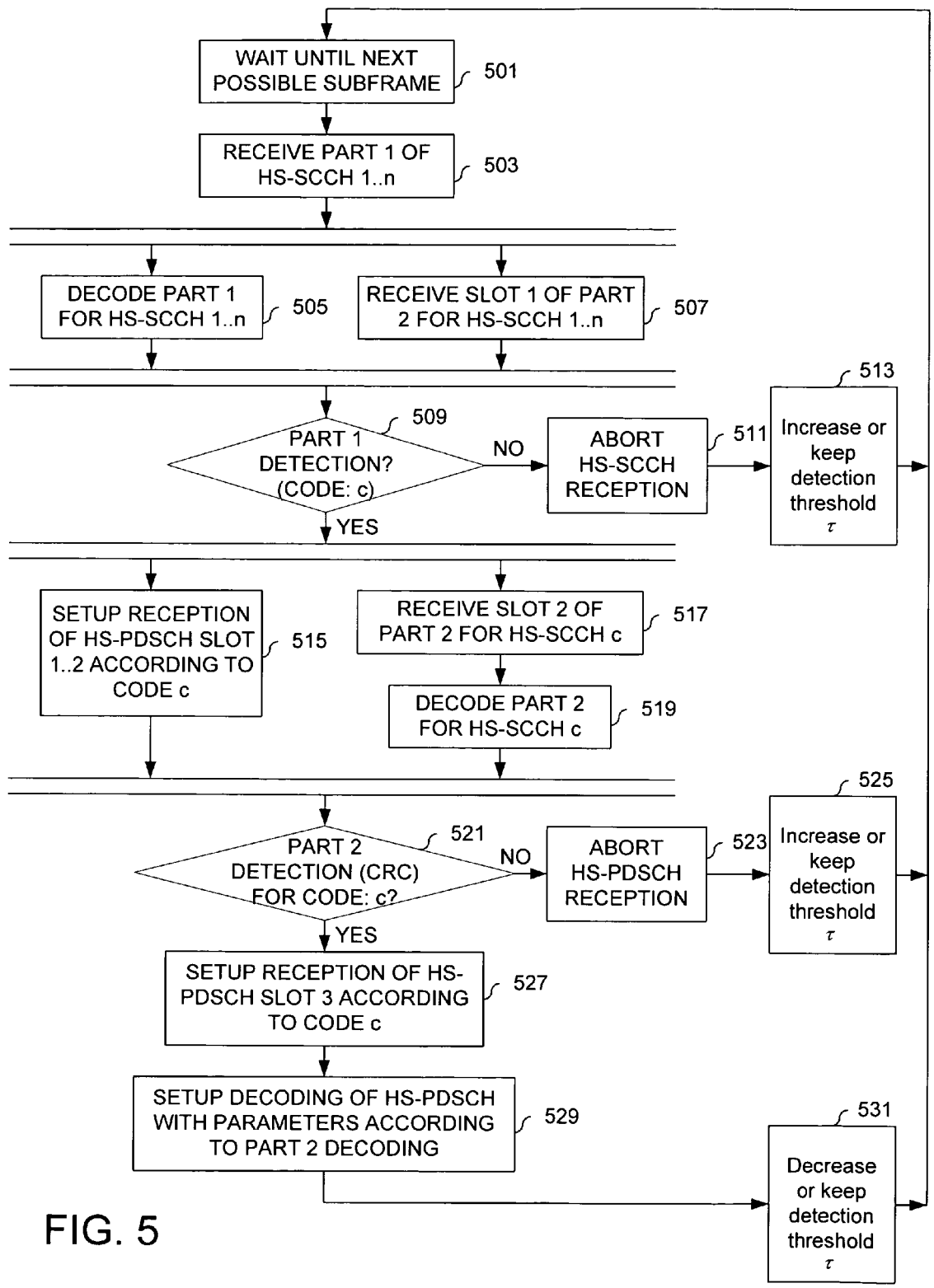
FIG. 5 is a flowchart that depicts exemplary logic that decodes HS-SCCH and dynamically adjusts a threshold level, τ, in accordance with an exemplary embodiment of the invention.

FIG. 5 is a flowchart that depicts exemplary logic that decodes HS-SCCH and dynamically adjusts a threshold level, $\tau$, in accordance with an exemplary embodiment of the invention. Steps 501, 503, 505, and 507 operate the same as their counterpart steps 201, 203, 205, and 207, and therefore need not be described here in detail.

At the point of entering decision block 509, it needs to be determined whether the UE detected that the received HS-SCCH Part 1 is intended for this particular UE. To make this determination, any of the above-described tests involving comparison of a detection-indicating value (e.g., a correlation value or its equivalent) with the threshold level $\tau$ is used. If the answer is "no" ("NO" path out of decision block 509), then there is no point in taking further steps to receive this HS-SCCH, and the process is aborted (step 511). Since traffic behavior may also have changed, the threshold level $\tau$ is potentially adjusted (step 513). In the exemplary embodiment in which the presence or absence of a burst is the relevant traffic behavior, the threshold level $\tau$ is set to (or kept at) its high value, $\tau_{high}$, if it is determined that there is no ongoing burst of data directed to the UE. If there is the possibility that there continues to be an ongoing burst, despite the fact that the UE appears not to have been addressed by this particular HS-SCCH sub-frame, then the threshold level $\tau$ may be kept at an already existing low value, $\tau_{low}$. Processing then continues back at step 501.

If it has been determined that the decoded HS-SCCH Part 1 is intended for this UE ("YES" path out of decision block 509), then it is known which code, c, applies to this HS-SCCH. Processing then continues by using the spreading codes from the Part 1 decoding to set up the UE to receive the HS-PDSCH (step 515) and, in parallel with this action, receiving the second slot of part 2 for HS-SCCH associated with code c (step 517) and then decoding part 2 of the HS-SCCH associated with code c (step 519).

After the HS-SCCH Part 2 has been received and decoded, its CRC code can be checked to determine whether decoding has been successful (decision block 521). If not ("NO" path out of decision block 521), then HS-PDSCH reception is aborted (step 523). It should be noted that the decoding of HS-SCCH Part 2 might have failed for any of a number of reasons. One possibility is that the Part 1 detection may have been a false alarm. This means that the UE was not really the intended recipient of the HS-SCCH. Alternatively, the failure to successfully decode Part 2 may have been due to actual corruption of the Part 2 data upon reception. In this exemplary embodiment, it is assumed that the failure is due to the existence of a false alarm.

Having taken the "NO" path out of decision block 521, it is once again possible that traffic behavior has changed since it was last checked. Thus, the threshold level $\tau$ is potentially adjusted (step 525). In the exemplary embodiment in which the presence or absence of a burst is the relevant traffic behavior, the threshold level $\tau$ may be set to (or kept at) its high value, $\tau_{high}$, if it is determined that there is no ongoing burst of data directed to the UE. If there is the possibility that there continues to be an ongoing burst, despite the fact that the UE appears not to have been addressed by this particular HS-SCCH sub-frame, then the threshold level $\tau$ may be kept at an already existing low value, $\tau_{low}$. Processing then reverts back to step 501.

If the HS-SCCH Part 2 decoding was successful ("YES" path out of decision block 521), then the UE is set up for reception of HS-PDSCH slot 3 according to code c (step 527). The UE is then set up to decode the HS-PDSCH using parameters derived from HS-SCCH Part 2 decoding (step 529). Also, the threshold level $\tau$ is potentially adjusted (step 531) to account for the possibility that traffic behavior has changed since it was last checked. In the exemplary embodiment in which the presence or absence of a burst is the relevant traffic behavior, the threshold level $\tau$ may be set to (or kept at) its low value, $\tau_{low}$, if it is determined that there is an ongoing burst of data directed to the UE (step 531). For example, using the exemplary test set forth above, the fact of coming through this path in the logic indicates that the UE has just been addressed. Thus, it is true that the UE has been addressed within the most recent n TTI's, and the threshold level, $\tau$, should be decreased to (or maintained at) its low level, $\tau_{low}$. If some other test for the presence of a burst is used, its outcome should be used to determine whether the threshold level, $\tau$, should be set to its low or high value. Processing then reverts back to step 501.

Figure 6:
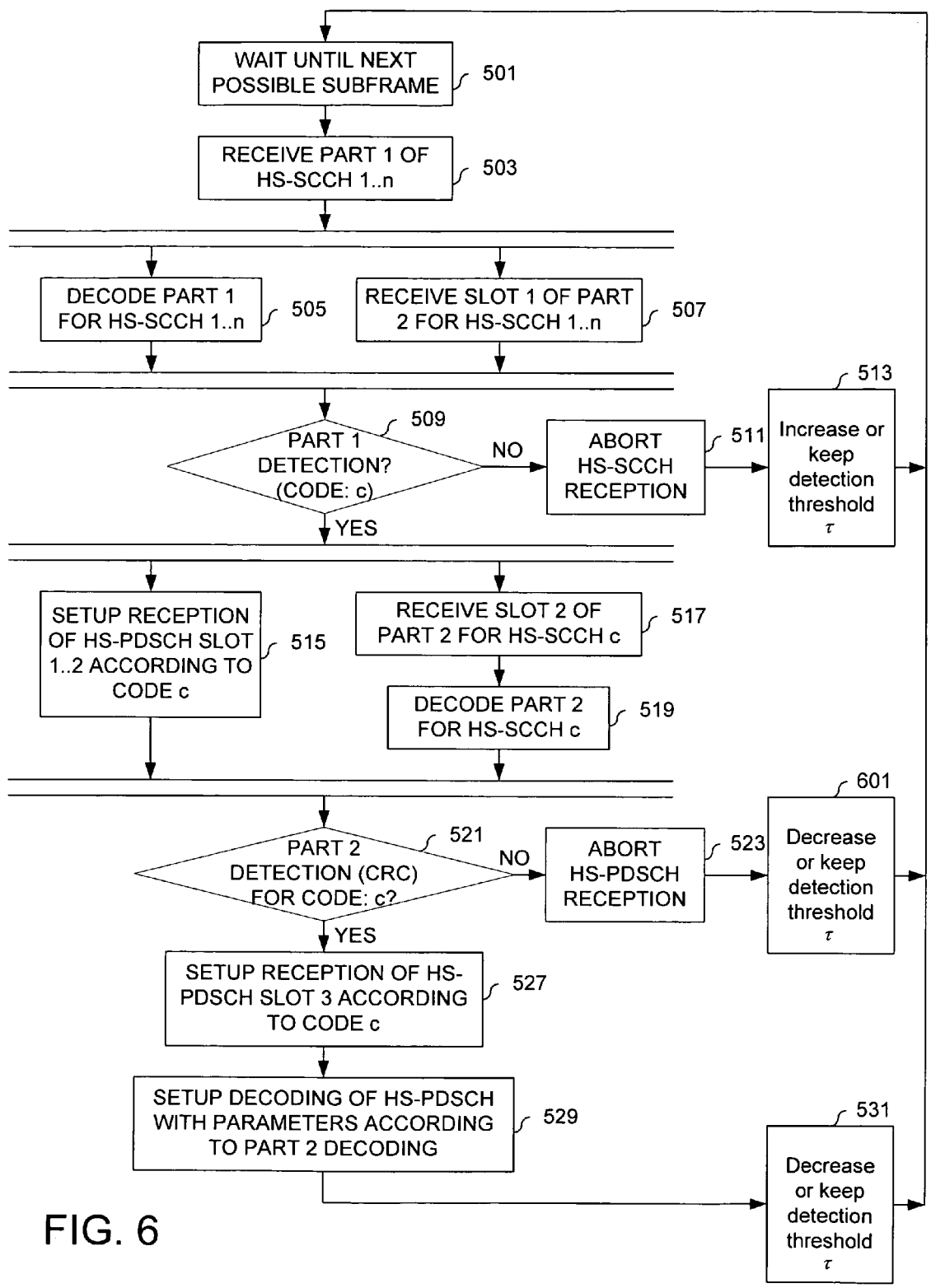
FIG. 6 is a flowchart that depicts exemplary logic that decodes HS-SCCH and dynamically adjusts a threshold level, τ, in accordance with an alternative exemplary embodiment of the invention.

FIG. 6 is a flowchart that depicts exemplary logic that decodes HS-SCCH and dynamically adjusts a threshold level, $\tau$, in accordance with an alternative exemplary embodiment of the invention. Those blocks in FIG. 6 having like-numbered reference numerals as those depicted in FIG. 5 perform the same functions as their respective counterpart blocks in FIG. 5, and therefore need not be described here further. The flowchart of FIG. 6 differs from FIG. 5 by not including block 525, and by instead including block 601.

Referring to the "NO" path out of decision block 521 in FIG. 6, it will again be recalled that the decoding of HS-SCCH Part 2 might have failed for any of a number of reasons. One possibility is that the Part 1 detection may have been a false alarm. This means that the UE was not really the intended recipient of the HS-SCCH. Alternatively, the failure to successfully decode Part 2 may have been due to actual corruption of the Part 2 data upon reception. In this alternative exemplary embodiment, it is assumed that the UE really was the intended recipient of the HS-SCCH, and that the failure is instead due to corruption of the Part 2 data upon reception. Accordingly, when it comes time to reevaluate whether the threshold level τ is set at an appropriate level, it is assumed that burst conditions prevail. Thus, the threshold level should be set to (or kept at) a low level, $\tau_{low}$, (step 601). In all other respects, however, the logic depicted in FIG. 6 is identical to that depicted in FIG. 5. Although the methods of FIGS. 5 and 6 have been described in connection with two threshold levels, any of the different threshold levels discussed above can be employed.

Turning now to other improvements that can be made to the ML-algorithm introduced in the Background section, it is possible to reduce the complexity of the ML-algorithm in a number of ways.

In one aspect of the invention, the number of codewords to correlate with can be reduced from 256 to 240. An inspection of how $X_{ccs}$ is constructed (see 3GPP TS 25.212 V5.6.0 (2003-09)) reveals how this is possible. The $X_{ccs}$ (7 bits) is constructed as $$x_{ccs,1}, x_{ccs,2}, x_{ccs,3} = \min(P-1, 15-P)$$

$$x_{ccs,4}, x_{ccs,5}, x_{ccs,6}, x_{ccs,7} = |O-1-15 \lfloor P/8 \rfloor|$$

where P is the starting code and O is the number of codes. Working through the above definition it turns out that $X_{ccs} \in [112, \ldots, 119]$ does not signal anything meaningful, and will thus not be used by Node B. In $X_1$ formulation, it corresponds to the following set of codewords being illegal: $X_1 \in [224, \ldots, 239]$.

With this simplification, the number of correlations to be made is reduced from $256 n_c$ to $240 n_c$ (i.e., the number of rows in $S_1^{mat}$ is reduced).

In another aspect, it is possible to reduce the number of possible codewords based on UE category. It is expected that most UE's will not be capable of receiving more than 5 or 10 spreading codes in parallel; some may not even be capable of 16 QAM reception. This will limit the set of possible O, P and $X_{ms}$ values further, and thus reduce the number of possible codewords for a certain UE. The capability of a UE in terms of multi-code and 16 QAM reception is given by the UE Category (see 3GPP TS 25.306 V5.6.0 (2003-09) for details). Below, the number of possible codewords has been calculated for the different UE Categories:

| UE Category | Max nr of codes | 16QAM | Size (X1) |
|---|---|---|---|
| 1-6 | 5 | Y | 130 |
| 7-8 | 10 | Y | 210 |
| 9-10 | 15 | Y | 240 |
| 11-12 | 5 | N | 65 |

With this simplification, the number of correlations to be made is reduced from $240 n_c$ to $130 n_c$ for a 5-code terminal with 16 QAM capability. This capability will be used in the test results that now follow.

Tests have been conducted to determine the performance of the HS-SCCH decoding methods described earlier. The simulation setups used are based on the HS-SCCH test cases defined in 3GPP TS 25.101 V5.5.0 (2003-09). In these tests, a genie path searcher has been used.

There are three HS-SCCH tests defined in 3GPP TS 25.101 V5.5.0 (2003-09). The differences in the test cases are channel conditions (PA3 or VA3O) and location in the cell ($\hat{I}_{or}/I_{oc}=0$ or 5). The test is whether the UE under test has a probability of miss detection $P(E_m)$ less than a specification value at a certain $E_c/I_{or}$ for the HS-SCCH. In the tests the UE is informed that the cell has four channel codes for HS-SCCH. The UE under test is addressed every third TTI in a pattern " ... XOOXOOXOOX ... ". Specific UE identities to be used have been defined.

Figure 7:
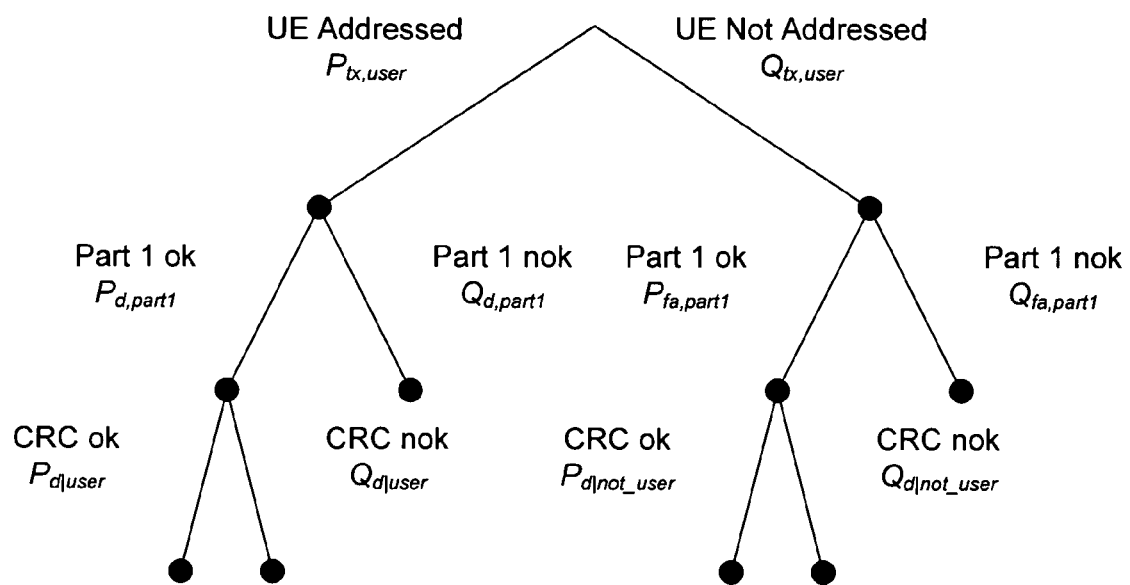
FIG. 7 is a tree diagram illustrating possible decoding outcomes from a number of scenarios of interest.

FIG. 7 is a tree diagram illustrating possible decoding outcomes from a number of scenarios of interest. The 3GPP test cases only specify a minimal performance in the left part of the graph (i.e., when the UE is addressed). The test quantity, probability of miss detection, is given by $$P(E_m) = Q_{d,part1} + P_{d,part1} Q_{d|user}$$

with the notation being taken from FIG. 7. The right side of the graph is, however, also of importance with respect to decreasing current consumption due to false alarms. As was shown earlier (see, e.g., FIG. 5), if a false alarm is generated, the UE will continue HS-SCCH decoding with Part 2, and set up the RAKE receiver for HS-PDSCH reception.

This analysis will not look into the "pathological" cases occurring when the CRC fails to certify that the detection was incorrect. The probability for this event is $2^{16} = 1.52e-5$, that is, one CRC check in 65000. The error event will only happen when a false detection in Part 1 occurs and the CRC checks, which will occur approximately once in a few hours. These error cases are quite severe, but will be handled by higher layers.

The methods to be evaluated only differ in the method used for detecting whether a good enough correlation is found in HS-SCCH Part 1 decoding. The methods under test will be enumerated as follows.

| Method | Description |
|---|---|
| 1 | Comparing a variance estimation as described in the Background section with a threshold τ. |
| 2 | Comparing the ratio between largest and the second largest correlation with a threshold τ, as described earlier. |
| 3 | Comparing a simplified variance estimation, as described earlier, with a threshold τ. |

In all cases it is assumed that the UE Category is 6 (i.e., 16QAM with 5 multi-codes). This assumption reduces the number of possible codewords to 130.

Figure 8:
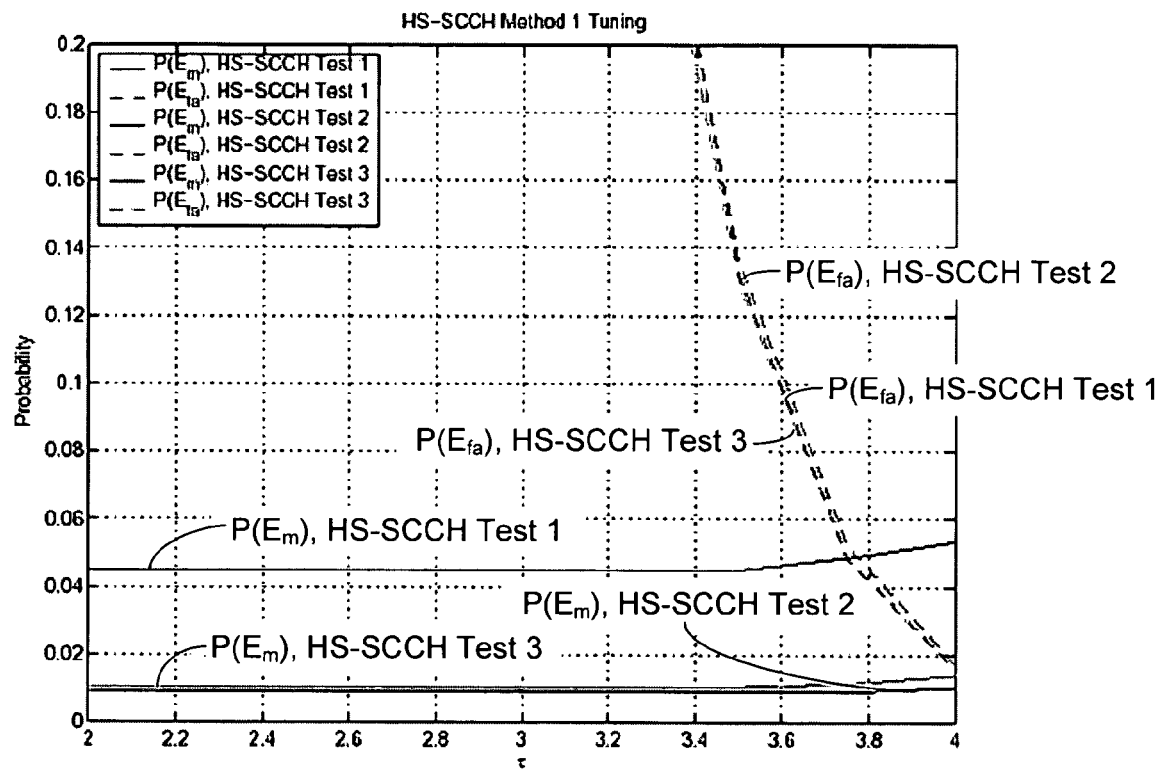
FIGS. 8-10 are graphs showing test results for tests with different thresholds for three methods described herein.
Figure 9:
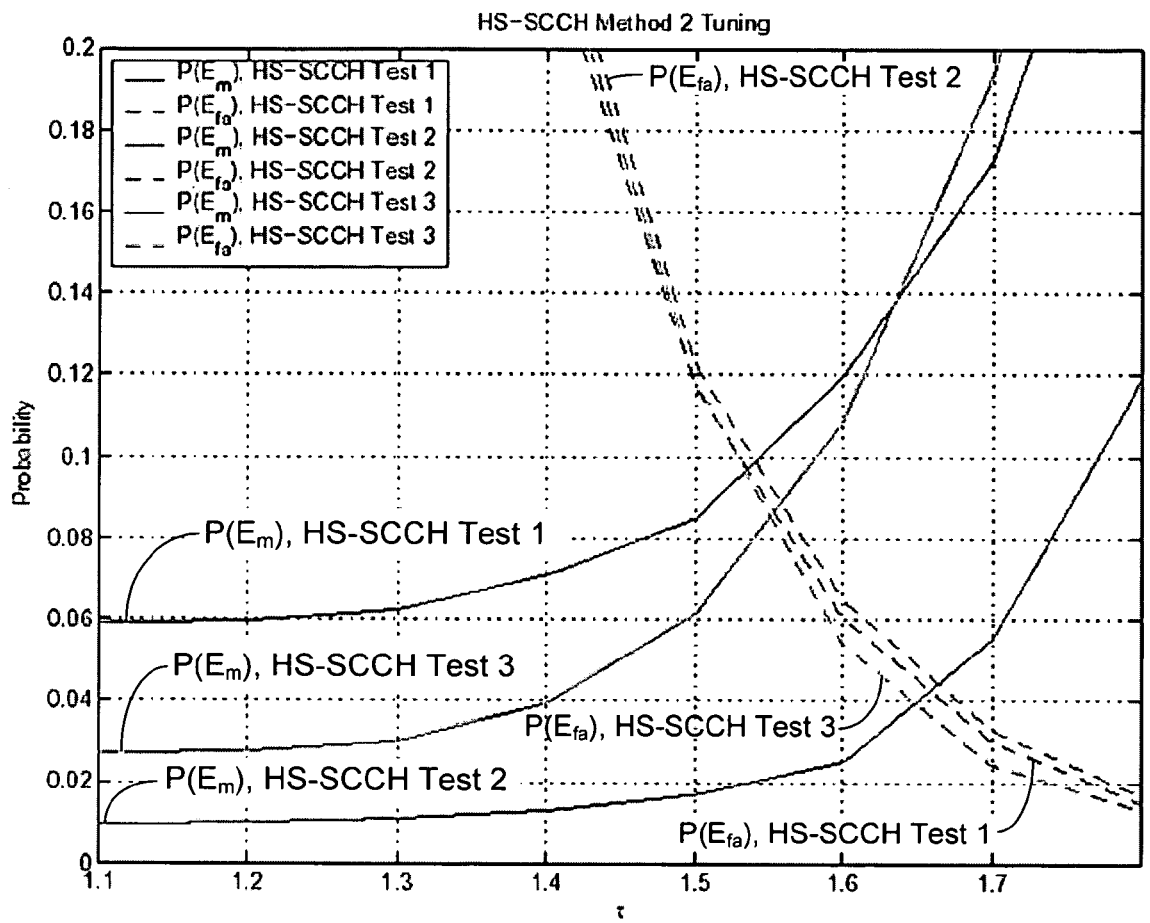
Figure 10:
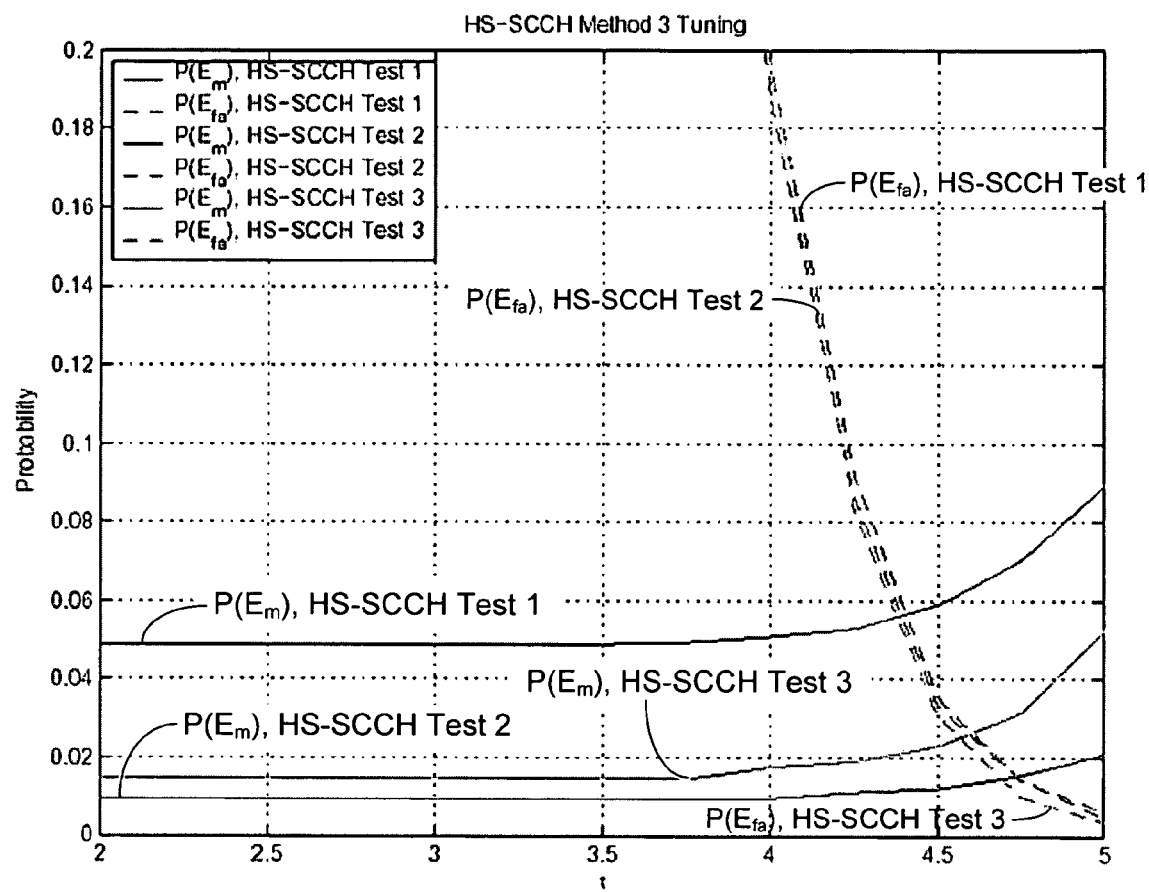

FIGS. 8-10 are graphs showing test results for tests with different thresholds for the three methods. More particularly, FIG. 8 depicts probabilities of miss detection and for false alarm for different threshold values, τ when the tuning of Method 1 is employed. FIG. 9 depicts probabilities of miss detection and for false alarm for different threshold values, τ when the tuning of Method 2 is employed. FIG. 10 depicts probabilities of miss detection and for false alarm for different threshold values, τ when the tuning of Method 3 is employed.

The tests were performed for the 3GPP HS-SCCH test cases, with a fixed HS-SCCH $E_c/I_{or}$ (−11.5, −12, −13 for the test cases respectively). In FIGS. 8-10, the probabilities for miss detection and false alarm are shown for different values of the threshold, τ. It can be seen that the trade-off between false alarm and miss detection is quite tricky. Below one threshold that gave good probability of miss detection and one threshold that gives reasonable probability for false alarm were chosen. These could be reasonable values to use in an adaptive threshold algorithm; otherwise, some compromise fixed threshold value would need to be used.

| Method | Threshold |
|---|---|
| 1 | 3.0 |
| 1 | 4.0 |
| 2 | 1.2 |
| 2 | 1.6 |
| 3 | 3.5 |
| 3 | 4.5 |

The lower threshold is designed to be used inside a traffic burst, while the higher is designed to be used between traffic bursts.

The performance of the chosen methods and thresholds will now be evaluated in the HS-SCCH test cases defined in 3GPP TS 25.101 V5.5.0 (2003-09). The test cases only require good enough performance on probability of miss detection, but to lower the power consumption the probability of false alarm has to be considered as well.

False alarm probability is not dependent on HS-SCCH $E_c/I_{or}$ because no HS-SCCH is sent to the UE when there is a false alarm. The false alarm probabilities simulated for different methods and thresholds are:

| Method | Test case | Threshold | False alarm probability |
|---|---|---|---|
| 1 | 1 | 3.0 | 55% |
| 1 | 2 | 3.0 | 55% |
| 1 | 3 | 3.0 | 55% |
| 1 | 1 | 4.0 | 1.8% |
| 1 | 2 | 4.0 | 1.9% |
| 1 | 3 | 4.0 | 1.7% |
| 2 | 1 | 1.2 | 70% |
| 2 | 2 | 1.2 | 71% |
| 2 | 3 | 1.2 | 70% |
| 2 | 1 | 1.6 | 6.2% |
| 2 | 2 | 1.6 | 6.4% |
| 2 | 3 | 1.6 | 5.7% |
| 3 | 1 | 3.5 | 62% |
| 3 | 2 | 3.5 | 60% |
| 3 | 3 | 3.5 | 61% |
| 3 | 1 | 4.5 | 3.8% |
| 3 | 2 | 4.5 | 3.6% |
| 3 | 3 | 4.5 | 3.2% |

As seen from the false alarm probabilities above, Method 2 is clearly worse than the others. Method 1 seams slightly better than Method 3.

Figure 11:
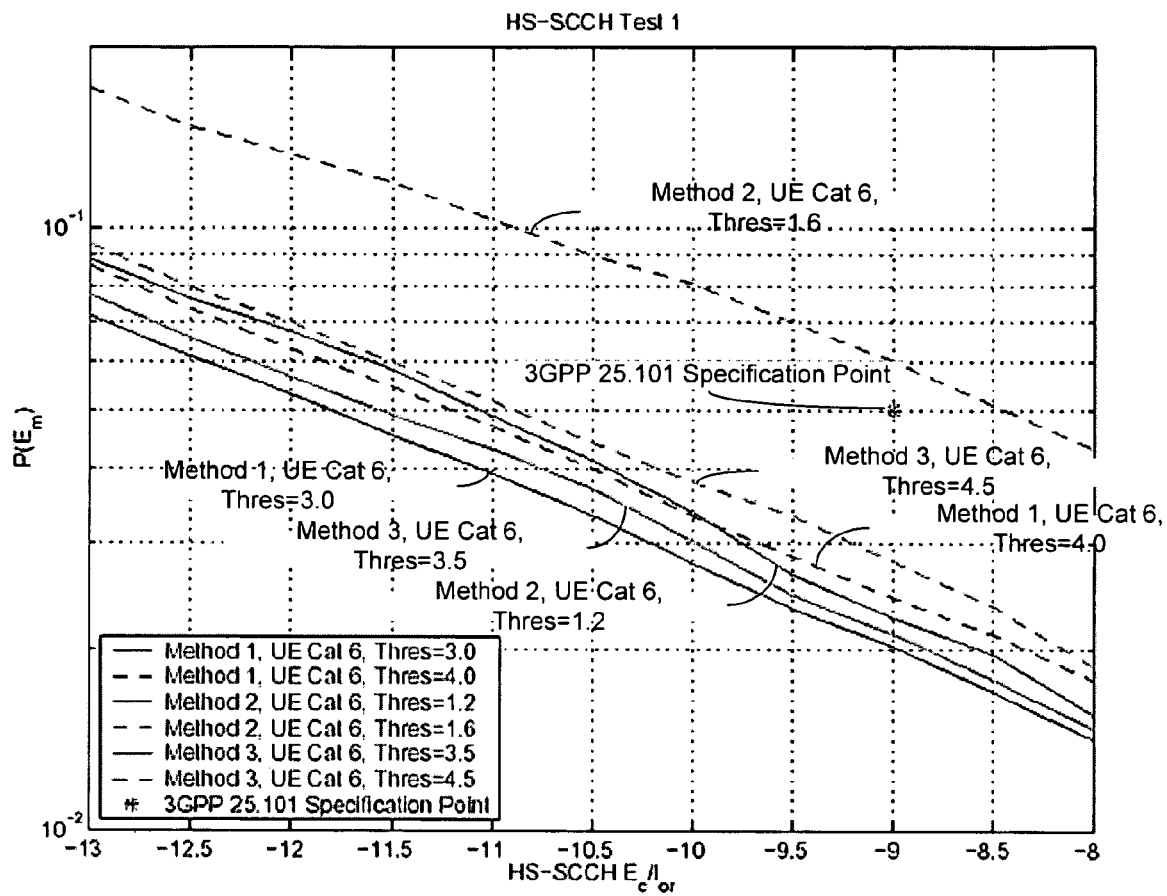
FIGS. 11-13 are graphs that depict the performance of the three herein-described methods for three HS-SCCH test cases.
Figure 12:
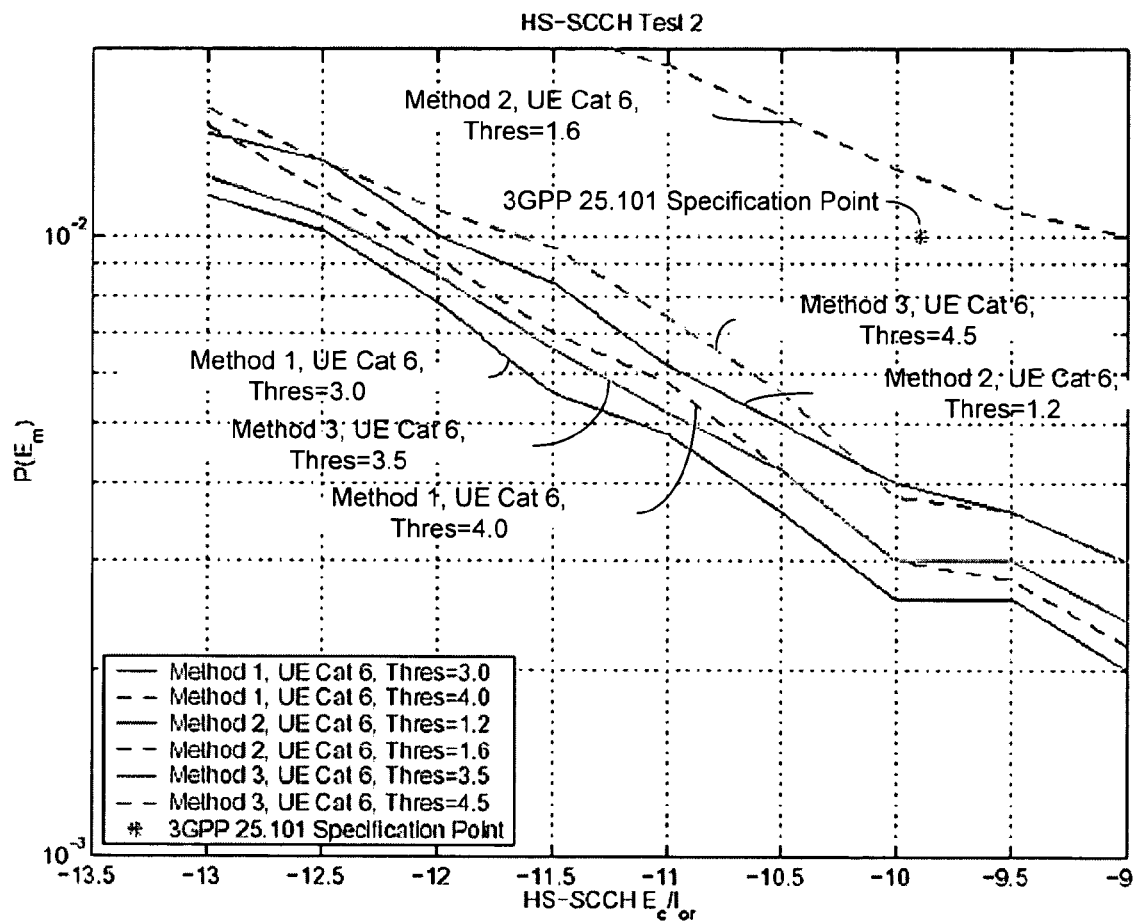
Figure 13:
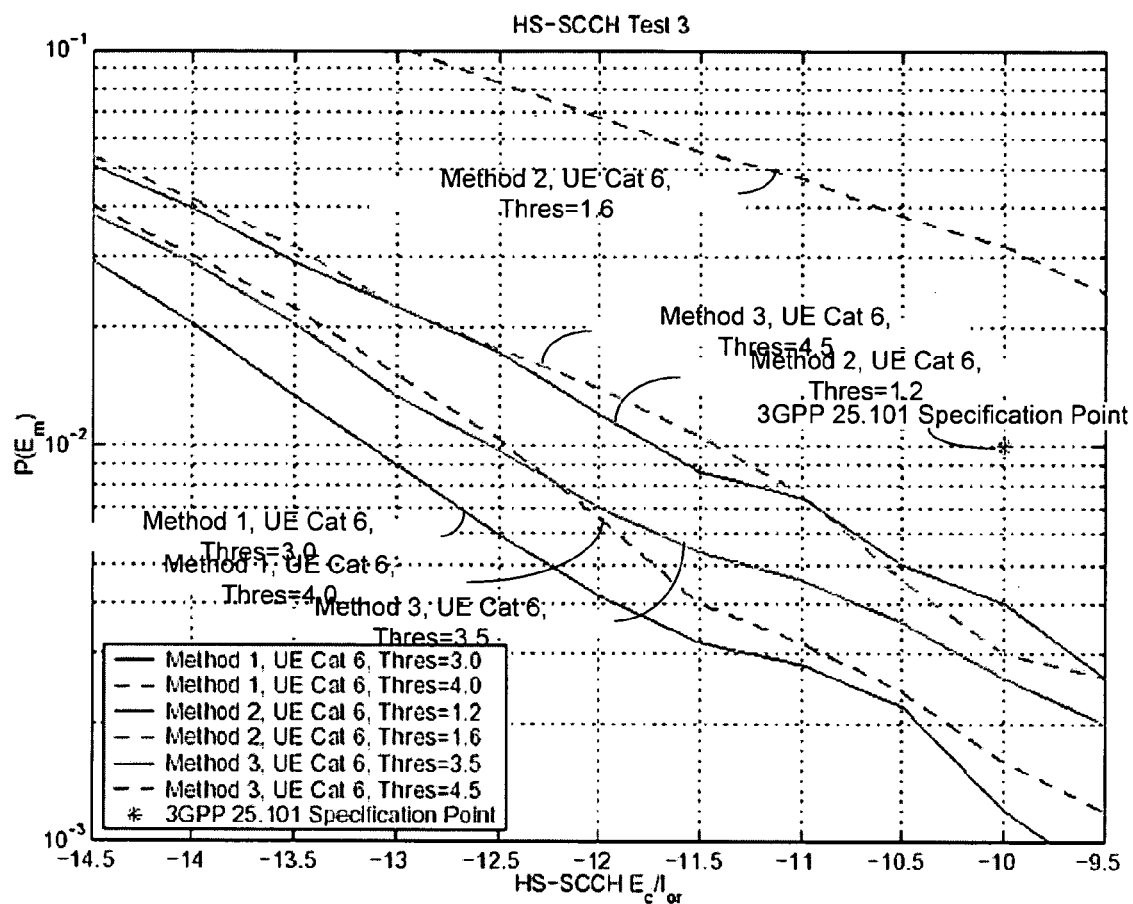

The discussion will now turn to the probability of miss detection, $P(E_m)$. FIGS. 11-13 are graphs that depict the performance of the three methods for the three HS-SCCH test cases. More particularly, FIG. 11 is a graph depicting the performance of decoding Methods 1, 2, and 3 for the 3GPP HS-SCCH test case 1. FIG. 12 is a graph depicting the performance of decoding Methods 1, 2, and 3 for the 3GPP HS-SCCH test case 2. And, FIG. 13 is a graph depicting the performance of decoding Methods 1, 2, and 3 for the 3GPP HS-SCCH test case 3.

From the performance tests, it is clearly seen that Method 2 is outperformed by the other two methods, both in probability of miss detection and probability of false alarm. The performance gap is less between Method 1 and Method 3. Method 1 is however slightly better in both probability of miss detection and probability of false alarm.

If the adaptive threshold method described earlier is implemented, the following implementation margins (i.e., shown as the distance between the low threshold curve and the 3GPP specification point) are obtained:

| Method | Test case | Implementation Margin (dB) |
|---|---|---|
| 1 | 1 | 2.8 |
| 1 | 2 | 2.6 |
| 1 | 3 | 3.1 |
| 2 | 1 | 2.1 |
| 2 | 2 | 2.1 |
| 2 | 3 | 1.7 |
| 3 | 1 | 2.6 |
| 3 | 2 | 2.4 |
| 3 | 3 | 2.5 |

The following conclusions are reached: Methods for HS-SCCH Part 1 decoding have been described and analyzed. All of the studied methods build on the ML-method correlating with all possible codewords. The complexity of the ML-correlations was decreased by observing limitations in the number of possible codewords. The decrease of possible codewords came from some being unused, and in some cases due to not using the highest UE Category.

With respect to the problem of how to detect whether the network is addressing the UE, three methods with different complexity have been described. The three methods perform differently in terms of probability of miss detection and probability of false alarm. One method was however judged as better than the other two.

To avoid the tradeoff between probability of miss detection and probability of false alarm, an adaptive method for control of the decision threshold has been described.

With the proposed HS-SCCH decoding algorithms 2.6-3.1 dB in implementation margin is obtained, compared to the 3GPP specification point.

The invention has been described with reference to particular embodiments. However, it will be readily apparent to those skilled in the art that it is possible to embody the invention in specific forms other than those of the preferred embodiment described above. This may be done without departing from the spirit of the invention.

It should be noted that the UE may perform the Part 1 decoding in different ways, depending on whether or not it is in a burst. Generally, the UE can handle the reception of HS-SCCH Part 1 information in different ways, depending on whether it is in a burst or not.

Thus, the preferred embodiment is merely illustrative and should not be considered restrictive in anyway. The scope of the invention is given by the appended claims, rather than the preceding description, and all variations and equivalents which fall within the range of the claims are intended to be embraced therein.

What is claimed is:

1. A method of determining whether to abort reception of a multi-part message in a code division multiple access communication system, comprising:
   receiving a part of the multi-part message;
   generating a correlation value by correlating the received part of the multi-part message with a known sequence;
   comparing the correlation value with a threshold level;
   aborting reception of the multi-part message if the correlation value is less than a threshold level; and
   dynamically adjusting the threshold level based on a communication traffic behavior,
   wherein the communication traffic behavior accounts for the recentness of traffic addressed to a particular UE.

2. The method of claim 1, wherein the comparing step is performed as:

$$C_{detection} = \begin{cases} \text{if } \max_{c \in [1,\ldots,n_c]} \frac{D(ML_c, c)}{\sqrt{V_c}} > \tau \text{ then } \underset{c \in [1,\ldots,n_c]}{maxind}\left(\frac{D(ML_c, c)}{sqrt(V_c)}\right) \\ \text{else no detection} \end{cases}$$

$$X_{1\_detection} = ML_{c\_detection}$$

wherein c is a code, $ML_c$ is a maximum likelihood detection for each code c, D is a decision matrix, $V_c$ is a variance of code c, $\tau$ is a threshold, $n_c$ is an index corresponding to a number of codes, $X_{1\_detection}$ is the resulting code word number, and $ML_{c\_detection}$ is the number of the code word giving the largest correlation for spreading code c_detection.

3. The method of claim 1, wherein the comparing step is performed as:

$$C_{detection} = \begin{cases} \text{if } \max_{c \in [1,\ldots,n_c]} \frac{D(ML_c, c)}{S_c} > \tau \text{ then } \underset{c \in [1,\ldots,n_c]}{maxind}\left(\frac{D(ML_c, c)}{S_c}\right) \\ \text{else no detection} \end{cases}$$

$$X_{1\_detection} = ML_{c\_detection} \text{ where}$$

$$S_c = 1/\text{length}(D(:,c)) \sum_{i=\text{all elemnts excl. } ML_c} |D(i,c)|$$

wherein c is a code, MLc is a maximum likelihood detection for each code c, D is a decision matrix, $S_c$ is a standard deviation of code c, $\tau$ is a threshold, $n_c$ is an index corresponding to a number of codes, $X_{1\_detection}$ is the resulting code word number, and $ML_{c\_detection}$ is the number of the code word giving the largest correlation for spreading code c_detection.

4. The method of claim 1, wherein the comparing step is performed by comparing a ratio between a highest correlation and a second highest correlation with a threshold.

5. The method of claim 1, wherein the threshold level is permitted to assume any one of a plurality of possible threshold levels.

6. The method of claim 5 comprising:
if it is detected that traffic directed to the particular UE is part of a burst directed to that UE, then ensuring that the threshold level takes on a lower one of the plurality of possible threshold levels; and
if it is not detected that traffic directed to the particular UE is part of a burst directed to that UE, then ensuring that the threshold level takes on a higher one of the plurality of possible threshold levels.

7. The method of claim 5, wherein the plurality of possible threshold levels consists of a low threshold level and a high threshold level.

8. The method of claim 5, wherein an intermediate threshold is set to one of the plurality of possible threshold levels, and the intermediate threshold is filtered.

9. The method of claim 1, wherein the code division multiple access communication system is a High Speed Downlink Packet Access (HSDPA) system.

10. The method of claim 9, wherein the part of the multi-part message is a High Speed Shared Control Channel Part 1 (HS-SCCH Part 1) message.

11. The method of claim 10, wherein:
the HSDPA system includes a full set of possible known sequences;
the correlation value is one of a set of correlation values that are generated by correlating each of a reduced set of possible known sequences against the HS-SCCH Part 1 message; and
the reduced set of possible known sequences is generated from the full set of possible known sequences.

12. The method of claim 11, wherein:
the reduced set of possible known sequences includes only those known sequences that are associated with one or more capabilities of a first User Equipment (UE); and
the full set of possible known sequences includes at least one known sequence that is not associated with one or more capabilities of the first UE, and the at least one known sequence is associated with one or more capabilities of a second UE.

13. The method of claim 1, wherein the communication traffic behavior is whether the UE has been addressed at any time during a number, n, of the most recent transmission time intervals.

14. The method of claim 13, wherein the number, n, is equal to 10.

15. A method of determining whether to abort reception of a multi-part message in a code division multiple access communication system, comprising:
receiving a part of the multi-part message;
generating a correlation value by correlating the received part of the multi-part message with a known sequence;
comparing the correlation value with a threshold level;
aborting reception of the multi-part message if the correlation value is less than a threshold level; and
dynamically adjusting the threshold level based on a communication traffic behavior,
wherein the communication traffic behavior is whether traffic directed to a particular user equipment (UE) is part of a burst directed to that UE.

16. The method of claim 15, wherein detecting whether traffic directed to the particular UE is part of a burst directed to that UE comprises:
detecting whether the UE has been addressed at any time during a number, n, of the most recent transmission time intervals.

17. The method of claim 16, wherein the number, n, is equal to 10.

18. A method of determining whether to abort reception of a multi-part message in a code division multiple access communication system, comprising:
receiving a part of the multi-part message;
generating a correlation value by correlating the received part of the multi-part message with a known sequence;
comparing the correlation value with a threshold level;
aborting reception of the multi-part message if the correlation value is less than a threshold level; and
dynamically adjusting the threshold level based on a communication traffic behavior,
wherein the code division multiple access communication system is a High Speed Downlink Packet Access (HS-DPA) system,
wherein the part of the multi-part message is a High Speed Shared Control Channel Part 1 (HS-SCCH Part 1) message,
wherein:
the HSDPA system includes a full set of possible known sequences;
the correlation value is one of a set of correlation values that are generated by correlating each of a reduced set of possible known sequences against the HS-SCCH Part 1 message; and the reduced set of possible known sequences is generated from the full set of possible known sequences, and wherein the reduced set of possible known sequences includes only those known sequences that do not correspond to an illegal codeword.

19. A method of decoding a High Speed Shared Control Channel Part 1 (HS-SCCH Part 1) message in a High Speed Downlink Packet Access (HSDPA) system that includes a full set of possible codewords, the method comprising:

receiving the HS-SCCH Part 1 message;

generating a set of correlation values by correlating each of a reduced set of possible codewords, against the received HS-SCCH Part 1 message; and selecting as a decoded value that one of the reduced set of possible codewords that is associated with a highest one of the correlation values, wherein the reduced set of possible codewords is generated from the full set of possible codewords, and wherein the reduced set of possible codewords includes only those codewords that are not illegal codewords.

20. A method of decoding a High Speed Shared Control Channel Part 1 (HS-SCCH Part 1) message in a High Speed Downlink Packet Access (HSDPA) system that includes a full set of possible codewords, the method comprising:

receiving the HS-SCCH Part 1 message;

generating a set of correlation values by correlating each of a reduced set of possible codewords, against the received HS-SCCH Part 1 message; and selecting as a decoded value that one of the reduced set of possible codewords that is associated with a highest one of the correlation values, wherein the reduced set of possible codewords is generated from the full set of possible codewords, and wherein:

the reduced set of possible codewords includes only those codewords that are associated with one or more capabilities of a first User Equipment (UE); and the full set of possible codewords includes at least one codeword that is not associated with one or more capabilities of the first UE, and the at least one codeword is associated with one or more capabilities of a second UE.

21. An apparatus that determines whether to abort reception of a multi-part message in a code division multiple access communication system, the apparatus comprising:

logic that receives a part of the multi-part message;

logic that generates a correlation value by correlating the received part of the multi-part message with a known sequence;

logic that compares the correlation value with a threshold level;

logic that aborts reception of the multi-part message if the correlation value is less than a threshold level; and logic that dynamically adjusts the threshold level based on a communication traffic behavior;

wherein the communication traffic behavior accounts for the recentness of traffic addressed to a particular UE.

22. The apparatus of claim 21, wherein the logic that compares performs:

$$c_{detection} = \begin{cases} \text{if } \max_{c \in [1,\ldots,n_c]} \frac{D(ML_c, c)}{\sqrt{V_c}} > \tau \text{ then } \max ind_{c \in [1,\ldots,n_c]}\left(\frac{D(ML_c, c)}{sqrt(V_c)}\right) \\ \text{else no detection} \end{cases}$$

$$X_{1\_detection} = ML_{c\_detection}.$$

wherein c is a code, $ML_c$ is a maximum likelihood detection for each code c, D is a decision matrix, $V_c$ is a variance of code c, $\tau$ is a threshold, $n_c$ is an index corresponding to a number of codes, $X_{1\_detection}$ is the resulting code word number, and $ML_{c\_detection}$ is the number of the code word giving the largest correlation for spreading code c_detection.

23. The apparatus of claim 21, wherein the logic that compares performs:

$$c_{detection} = \begin{cases} \text{if } \max_{c \in [1,\ldots,n_c]} D(ML_c, c)/S_c > \tau \text{ then } \max ind_{c \in [1,\ldots,n_c]} (D(ML_c, c)/S_c) \\ \text{else no detection} \end{cases}$$

$$X_{1\_detection} = ML_{c\_detection} \text{ where}$$

$$S_c = 1/\text{length}(D(:, c)) \sum_{i=\text{all elements excl.}ML_c} |D(i, c)|$$

wherein c is a code, MLc is a maximum likelihood detection for each code c, D is a decision matrix, $S_c$ is a standard deviation of code c, $\tau$ is a threshold, $n_c$ is an index corresponding to a number of codes, $X_{1\_detection}$ is the resulting code word number, and $ML_{c\_detection}$ is the number of the code word giving the largest correlation for spreading code c_detection.

24. The apparatus of claim 21, wherein the logic that compares a ratio between a highest correlation and a second highest correlation with a threshold.

25. The apparatus of claim 21, wherein the threshold level is permitted to assume any one of a plurality of possible threshold levels.

26. The apparatus of claim 25 comprising:

logic that ensures that the threshold level takes on a lower one of the plurality of possible threshold levels if it is detected that traffic directed to the particular UE is part of a burst directed to that UE; and logic that ensures that the threshold level takes on a higher one of the plurality of possible threshold levels if it is not detected that traffic directed to the particular UE is part of a burst directed to that UE.

27. The apparatus of claim 25, wherein the plurality of possible threshold levels consists of a low threshold level and a high threshold level.

28. The apparatus of claim 25, wherein an intermediate threshold is set to one of the plurality of possible threshold levels, and the intermediate threshold is filtered.

29. The apparatus of claim 21, wherein the code division multiple access communication system is a High Speed Downlink Packet Access (HSDPA) system.

30. The apparatus of claim 29, wherein the part of the multi-part message is a High Speed Shared Control Channel Part 1 (HS-SCCH Part 1) message.

31. The apparatus of claim 30, wherein:

the HSDPA system includes a full set of possible known sequences;

the correlation value is one of a set of correlation values that are generated by correlating each of a reduced set of possible known sequences against the HS-SCCH Part 1 message; and the reduced set of possible known sequences is generated from the full set of possible known sequences.

32. The apparatus of claim 31, wherein:

the reduced set of possible known sequences includes only those known sequences that are associated with one or more capabilities of a first User Equipment (UE); and the full set of possible known sequences includes at least one known sequence that is not associated with one or more capabilities of the first UE, and the at least one known sequence is associated with one or more capabilities of a second UE.

33. The apparatus of claim 21, wherein the communication traffic behavior is whether the UE has been addressed at any time during a number, n, of the most recent transmission time intervals.

34. The apparatus of claim 33, wherein the number, n, is equal to 10.

35. An apparatus that determines whether to abort reception of a multi-part message in a code division multiple access communication system, the apparatus comprising:
  logic that receives a part of the multi-part message;
  logic that generates a correlation value by correlating the received part of the multi-part message with a known sequence;
  logic that compares the correlation value with a threshold level;
  logic that aborts reception of the multi-part message if the correlation value is less than a threshold level; and
  logic that dynamically adjusts the threshold level based on a communication traffic behavior,
  wherein the communication traffic behavior is whether traffic directed to a particular user equipment (UE) is part of a burst directed to that UE.

36. The apparatus of claim 35, wherein the logic that detects whether traffic directed to the particular UE is part of a burst directed to that UE comprises:
  logic that detects whether the UE has been addressed at any time during a number, n, of the most recent transmission time intervals.

37. The apparatus of claim 36, wherein the number, n, is equal to 10.

38. An apparatus that determines whether to abort reception of a multi-part message in a code division multiple access communication system, the apparatus comprising:
  logic that receives a part of the multi-part message;
  logic that generates a correlation value by correlating the received part of the multi-part message with a known sequence;
  logic that compares the correlation value with a threshold level;
  logic that aborts reception of the multi-part message if the correlation value is less than a threshold level; and
  logic that dynamically adjusts the threshold level based on a communication traffic behavior,
  wherein the code division multiple access communication system is a High Speed Downlink Packet Access (HSDPA) system,
  wherein the part of the multi-part message is a High Speed Shared Control Channel Part 1 (HS-SCCH Part 1) message,
  wherein:
  the HSDPA system includes a full set of possible known sequences;
  the correlation value is one of a set of correlation values that are generated by correlating each of a reduced set of possible known sequences against the HS-SCCH Part 1 message; and
  the reduced set of possible known sequences is generated from the full set of possible known sequences, and
  wherein the reduced set of possible known sequences includes only those known sequences that do not correspond to an illegal codeword.

39. An apparatus that decodes a High Speed Shared Control Channel Part 1 (HS-SCCH Part 1) message in a High Speed Downlink Packet Access (HSDPA) system that includes a full set of possible codewords, the apparatus comprising:
  logic that receives the HS-SCCH Part 1 message;
  logic that generates a set of correlation values by correlating each of a reduced set of possible codewords against the received HS-SCCH Part 1 message; and
  logic that selects as a decoded value that one of the reduced set of possible codewords that is associated with a highest one of the correlation values,
  wherein the reduced set of possible codewords is generated from the full set of possible codewords, and
  wherein the reduced set of possible codewords includes only those codewords that are not illegal codewords.

40. An apparatus that decodes a High Speed Shared Control Channel Part 1 (HS-SCCH Part 1) message in a High Speed Downlink Packet Access (HSDPA) system that includes a full set of possible codewords, the apparatus comprising:
  logic that receives the HS-SCCH Part 1 message;
  logic that generates a set of correlation values by correlating each of a reduced set of possible codewords against the received HS-SCCH Part 1 message; and
  logic that selects as a decoded value that one of the reduced set of possible codewords that is associated with a highest one of the correlation values,
  wherein the reduced set of possible codewords is generated from the full set of possible codewords, and
  wherein:
  the reduced set of possible codewords includes only those codewords that are associated with one or more capabilities of a first User Equipment (UE); and
  the full set of possible codewords includes at least one codeword that is not associated with one or more capabilities of the first UE, and the at least one codeword is associated with one or more capabilities of a second UE.

41. A machine readable storage medium having stored thereon one or more instructions that cause a processor to determine whether to abort reception of a multi-part message in a code division multiple access communication system, the one or more instructions causing the processor to perform:
  receiving a part of the multi-part message;
  generating a correlation value by correlating the received part of the multi-part message with a known sequence;
  comparing the correlation value with a threshold level;
  aborting reception of the multi-part message if the correlation value is less than a threshold level; and
  dynamically adjusting the threshold level based on a communication traffic behavior,
  wherein the communication traffic behavior accounts for the recentness of traffic addressed to a particular UE.

42. A machine readable storage medium having stored thereon one or more instructions that cause a processor to determine whether to abort reception of a multi-part message in a code division multiple access communication system, the one or more instructions causing the processor to perform:
  receiving a part of the multi-part message;
  generating a correlation value by correlating the received part of the multi-part message with a known sequence;
  comparing the correlation value with a threshold level;
  aborting reception of the multi-part message if the correlation value is less than a threshold level; and
  dynamically adjusting the threshold level based on a communication traffic behavior, wherein the communication traffic behavior is whether traffic directed to a particular user equipment (UE) is part of a burst directed to that UE.

43. The machine readable storage medium of claim 42, wherein detecting whether traffic directed to the particular UE is part of a burst directed to that UE comprises:
   detecting whether the UE has been addressed at any time during a number, n, of the most recent transmission time intervals.

44. A machine readable storage medium having stored thereon one or more instructions that cause a processor to decode a High Speed Shared Control Channel Part 1 (HS-SCCH Part 1) message in a High Speed Downlink Packet Access (HSDPA) system that includes a full set of possible codewords, the one or more instructions causing the processor to perform:
   receiving the HS-SCCH Part 1 message;
   generating a set of correlation values by correlating each of a reduced set of possible codewords against the received HS-SCCH Part 1 message; and
   selecting as a decoded value that one of the reduced set of possible codewords that is associated with a highest one of the correlation values,
   wherein the reduced set of possible codewords is generated from the full set of possible codewords, and
   wherein the reduced set of possible codewords includes only those codewords that are not illegal codewords.

45. A machine readable storage medium having stored thereon one or more instructions that cause a processor to decode a High Speed Shared Control Channel Part 1 (HS-SCCH Part 1) message in a High Speed Downlink Packet Access (HSDPA) system that includes a full set of possible codewords, the one or more instructions causing the processor to perform:
   receiving the HS-SCCH Part 1 message;
   generating a set of correlation values by correlating each of a reduced set of possible codewords against the received HS-SCCH Part 1 message; and
   selecting as a decoded value that one of the reduced set of possible codewords that is associated with a highest one of the correlation values,
   wherein the reduced set of possible codewords is generated from the full set of possible codewords, and
   wherein:
   the reduced set of possible codewords includes only those codewords that are associated with one or more capabilities of a first User Equipment (UE); and
   the full set of possible codewords includes at least one codeword that is not associated with one or more capabilities of the first UE, and the at least one codeword is associated with one or more capabilities of a second UE.

* * * * *

UNITED STATES PATENT AND TRADEMARK OFFICE
CERTIFICATE OF CORRECTION

PATENT NO. : 7,406,070 B2  Page 1 of 1
APPLICATION NO. : 10/780633
DATED : July 29, 2008
INVENTOR(S) : Nilsson It is certified that error appears in the above-identified patent and that said Letters Patent is hereby corrected as shown below:

In Column 17, Line 16, in Claim 2, delete " $ML_{c\_detection}$ " and insert -- $ML_{c\_detection}$ --, therefor.

In Column 17, Line 30, in Claim 3, delete "MLc" and insert -- $ML_c$ --, therefor.

In Column 20, Line 5, in Claim 22, delete " $ML_{c\_detection}$ " and insert -- $ML_{c\_detection}$ --, therefor.

In Column 20, Line 21, in Claim 23, delete "MLc" and insert -- $ML_c$ --, therefor.

Signed and Sealed this

Eighth Day of September, 2009

David J. Kappos
*Director of the United States Patent and Trademark Office*